United States Patent
Noveck

(10) Patent No.: US 7,313,557 B1
(45) Date of Patent: Dec. 25, 2007

(54) MULTI-PROTOCOL LOCK MANAGER

(75) Inventor: David B. Noveck, Lexington, MA (US)

(73) Assignee: Network Appliance, Inc., Sunnyvale, CA (US)

(*) Notice: Subject to any disclaimer, the term of this patent is extended or adjusted under 35 U.S.C. 154(b) by 535 days.

(21) Appl. No.: 10/099,267

(22) Filed: Mar. 15, 2002

(51) Int. Cl.
G06F 17/30 (2006.01)

(52) U.S. Cl. ............... 707/8; 707/1; 707/10

(58) Field of Classification Search ............ 707/8, 707/10, 100, 201, 200, 101, 202; 709/203, 709/226, 213
See application file for complete search history.

(56) References Cited

U.S. PATENT DOCUMENTS

| | | | | |
|---|---|---|---|---|
| 4,399,504 A | * | 8/1983 | Obermarck et al. | 710/200 |
| 4,480,304 A | * | 10/1984 | Carr et al. | 710/200 |
| 5,163,131 A | | 11/1992 | Row et al. | |
| 5,175,837 A | * | 12/1992 | Arnold et al. | 711/152 |
| 5,339,427 A | * | 8/1994 | Elko et al. | 718/103 |
| 5,355,453 A | | 10/1994 | Row et al. | |
| 5,485,579 A | | 1/1996 | Hitz et al. | |
| 5,490,270 A | * | 2/1996 | Devarakonda et al. | 707/201 |
| 5,596,754 A | * | 1/1997 | Lomet | 710/200 |
| 5,742,813 A | * | 4/1998 | Kavanagh et al. | 707/8 |
| 5,745,747 A | * | 4/1998 | Chang et al. | 707/8 |
| 5,802,366 A | | 9/1998 | Row et al. | |
| 5,832,484 A | * | 11/1998 | Sankaran et al. | 707/8 |
| 5,931,918 A | | 8/1999 | Row et al. | |
| 5,941,972 A | | 8/1999 | Hoese et al. | |
| 6,065,037 A | | 5/2000 | Hitz et al. | |
| 6,128,710 A | * | 10/2000 | Greenspan et al. | 711/152 |
| 6,182,186 B1 | * | 1/2001 | Daynes | 710/200 |
| 6,324,581 B1 | * | 11/2001 | Xu et al. | 709/229 |
| 6,343,339 B1 | * | 1/2002 | Daynes | 710/200 |
| 6,389,420 B1 | * | 5/2002 | Vahalia et al. | 707/8 |
| 6,405,315 B1 | * | 6/2002 | Burns et al. | 713/190 |
| 6,425,035 B2 | | 7/2002 | Hoese et al. | |
| 6,453,354 B1 | * | 9/2002 | Jiang et al. | 709/229 |
| 6,516,351 B2 | * | 2/2003 | Borr | 709/229 |
| 6,606,626 B1 | * | 8/2003 | Ponnekanti | 707/8 |
| 6,745,209 B2 | * | 6/2004 | Holenstein et al. | 707/203 |
| 6,772,154 B1 | * | 8/2004 | Daynes et al. | 707/8 |
| 6,850,938 B1 | * | 2/2005 | Sadjadi | 707/8 |
| 6,917,942 B1 | * | 7/2005 | Burns et al. | 707/100 |
| 6,973,455 B1 | * | 12/2005 | Vahalia et al. | 707/8 |

(Continued)

OTHER PUBLICATIONS

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.

(Continued)

Primary Examiner—Jean M. Corrielus
(74) Attorney, Agent, or Firm—Cesari and McKenna LLP

(57) ABSTRACT

A multi-protocol lock manager efficiently manages granting, revoking and releasing of various types of locks on files or regions of files located on a file server, such as a filer. The various locks are associated with multiple different file access protocols, each having its own semantics. The multi-protocol lock manager allows the filer to take appropriate actions with respect to locking requests and other file access operations, while ensuring that the actions taken are always consistent with semantic requirements for each lock, as established by the associated file access protocol.

29 Claims, 12 Drawing Sheets

U.S. PATENT DOCUMENTS 7,003,531 B2 * 2/2006 Holenstein et al. ......... 707/201
7,096,324 B1 * 8/2006 May et al. .................. 711/149
2004/0010664 A1 * 1/2004 Cierniak .................... 711/152

OTHER PUBLICATIONS

DAFS: Direct Access File System Protocol, Version 1.0, Network Appliance, Inc., Sep. 1, 2001.

* cited by examiner

MULTI-PROTOCOL LOCK MANAGER

FIELD OF THE INVENTION

The present invention relates to storage systems and, more specifically, to a technique for efficiently administering locks for shared resources, such as files, stored on a storage system, such as a filer.

BACKGROUND OF THE INVENTION

A file server is a computer that provides file service relating to the organization of information on writeable persistent storage devices, such as memories, tapes or disks. The file server or filer may be embodied as a storage system including a storage operating system that implements a file system to logically organize the information as a hierarchical structure of directories and files on, e.g., the disks. Each "on-disk" file may be implemented as set of data structures, e.g., disk blocks, configured to store information, such as the actual data for the file. A directory, on the other hand, may be implemented as a specially formatted file in which information about other files and directories are stored.

A filer may be further configured to operate according to a client/server model of information delivery to thereby allow many client systems ("clients") to access shared resources, such as files, stored on a server, e.g., the filer. In this model, the client may comprise an application, such as a file system protocol, executing on a computer that "connects" to the filer over a computer network, such as a point-to-point link, shared local area network, wide area network or virtual private network implemented over a public network, such as the Internet. Each client may request the services of the filer by issuing file system protocol messages (in the form of packets) to the filer over the network. By supporting a plurality of file system protocols, such as the Network File System (NFS) protocol, the Direct Access File System (DAFS) protocol and the Common Internet File System (CIFS) protocol for the Microsoft® Windows™ operating system, the utility of the filer may be enhanced for networking clients.

There are known mechanisms used for synchronizing access to a common shared resource or set of resources, many of which are based on the use of semaphores. A semaphore is a variable, such as a hardware or software flag, with a value that indicates the status of the shared resource. To keep users, such as clients, from interfering with one another, a semaphore may be used to lock the resource. In this context, a lock is an abstraction that represents the right to access a resource or set of resources. Clients that access a shared resource obtain a lock that corresponds to that resource before manipulating its contents.

Locks may be mandatory, in which case the filer requires that no other client holds the corresponding lock when a request is made that affects this resource, rejecting the request if there is such another client. In this "mandatory" case, clients obtain locks to ensure that their requests to manipulate such resources cannot be rejected. Other locks are advisory, in which case the filer does not enforce any constraint on corresponding resources. In the "advisory" case, client applications establish their own convention that certain operations may only be performed with certain "held" locks. When adhered to by the client applications, this convention ensures that no destructive interference between clients can arise.

Resource contention arises when more than one client attempts to request exclusive access to a single shared resource or set of resources. A lock controller (manager) is a mechanism that may be used to determine which client may obtain the requested resource. To that end, the lock manager selects one client from among the plurality of requesting clients, typically in accordance with some arbitration policy. The other clients must then wait for the resource to be released before they can obtain access to it.

Prior support for locking on a multi-protocol storage system, such as a filer, utilized a conventional lock manager approach that supported only a limited number of file access protocols. That is, the prior lock manager approach did not provide support for a variety of file access protocols, but rather only supported a set of popular protocols such as, e.g., CIFS and NFS. It should be noted that locks for NFS versions 2 and 3 are generally obtained using a separate network lock manager (NLM) protocol; however, the combination of NFS and NLM is considered herein as a single integrated file access protocol, e.g., NFS.

In addition, the conventional lock manager approach provided no "clean" separation between protocol-specific processing and locking semantics. Program code in the prior lock manager contained explicit checks for lock compatibility, which included specific checks on the protocol associated with a requested lock. Such an approach is difficult to maintain with a limited number of supported protocols and may rapidly become unworkable (impractical) as further protocols are supported.

Moreover, only one of the supported protocols, e.g., CIFS, provides for revocable locks, which obviated the need to provide general support for such locks, including opportunistic locks, delegations and locks associated with expired leases. The CIFS protocol supports sharing of files and data between multiple Windows clients and, in fact, leverages such file sharing in its implementation of a Windows networking performance optimization known as "opportunistic locks" (oplocks). There are a number of types of oplocks. An exclusive oplock is a revocable exclusive (i.e., prevents, while held, all access from other clients) file lock that a Windows client obtains "opportunistically" at file open time if the file being opened is not currently being accessed by any other application. A shared (or type-2) oplock is a revocable shared (i.e., may be held by a number of clients) file lock that a Windows client also may obtain "opportunistically" when a file is being opened for reading if the file being opened is not currently opened for writing by any other application.

NFS Version 4 (NFS-v4) differs from previous versions of NFS by allowing a server to delegate specific actions on a file to a client to enable aggressive client caching of data and to allow caching of locking state. A server cedes control of file updates and locking state to a client via a write delegation, subject to recall of that delegation by the server. According to the NFS-v4 protocol, when only a single client references a file, the server may delegate responsibility for handling all open, close and locking operations to the client. Since the server on granting a delegation guarantees the client that there can be no conflicting open operations, the cached data is assumed valid. The server may also allow the client to retain modified data on the client without flushing at close time, if it can be guaranteed that sufficient space will be reserved on the server ensuring that subsequent write operations will not fail due to lack of space.

NFS-v4 also enables a server to allow multiple clients the ability to access file data in a non-interfering manner by means of a read delegation, subject to recall by the server. The NFS-v4 protocol allows the server to delegate to the client responsibility for handling open operations that do not specify write access or the denial of read access. This allows the client to cache unchanged file data without interacting with the server.

In order to deal with potential problems that would arise when a client system holding one or more locks ceases to function, and so is unable to release its lock, the NFS-v4 protocol associates client locks with leases, which represent the right of the client to have its locks maintained. Such leases are of limited duration with the expiration interval set by the server, but subject to renewal. The client system, in order to be assured of continued possession of its locks must periodically renew its lease. When a lease is not renewed in a timely fashion, the server may release all locks associated with the expired lease, or more desirably, make the locks revocable, in that a conflicting lock request by another client will be granted. However, if the lease is renewed before any such conflicting lock, the associated locks again become "normal" locks not subject to revocation in the event of a conflicting lock.

The DAFS protocol also provides support for delegations and leases in a manner similar to NFS-v4.

Therefore, an object of the present invention is to provide an improved lock manager that provides support for a variety of different file access protocols, including support for various types of revocable locks. CIFS oplocks, NFS-v4 and DAFS delegations, and NFS-v4 and DAFS locks associated with expired leases are all examples of revocable locks.

Another object of the present invention is to provide an improved multi-protocol lock manager having a locking model that is not "protocol-centric", but that accommodates different implementations of revocable lock-like features in the different protocols.

Yet another object of the invention is to provide a multi-protocol lock manager having a maintainable framework that efficiently performs file locking, while generally hiding implementation details from subsystems that implement the specific protocols and file system operations.

SUMMARY OF THE INVENTION

The invention comprises a multi-protocol lock manager configured to efficiently manage granting, revoking and releasing of various types of locks on files or regions of files located on a file server, such as a filer. The various locks are associated with multiple different file access protocols (e.g., CIFS, NFS/NLM, NFS-v4 and DAFS), each having its own semantics. The novel lock manager allows the filer to take appropriate actions with respect to locking requests and other file access operations, while ensuring that the actions taken are always consistent with semantic requirements for each lock, as established by the associated file access protocol.

For example, when a file access operation includes, as part of its handling, a request for a lock of a particular type, the multi-protocol lock manager decides whether to grant, refuse to grant, or wait for the appropriate time to grant that lock. This decision respects protocol-defined constraints on the kinds of locks that may be simultaneously granted for a given file. If the requested lock is revocable (e.g. a CIFS oplock or a NFS-v4 delegation), the lock manager further determines when the lock needs to be revoked because of a conflicting locking request or other conflicting file access operation. Although the specific file access protocol is responsible for actually revoking the lock, the lock manager allows the file access protocol's semantic requirements to be effected via specific calls to terminate the revocation process. The protocol-specific code may eliminate the revoked lock, make it un-revocable, or replace the lock with a set of one or more other locks.

In addition to being called for operations that request or release locks, the lock manager is also called to determine whether an existing lock obviates a file access operation. To that end, the lock manager determines whether that operation should fail or whether the lock should be revoked and the operation made to wait for the revocation. Notably, these decisions are made without unduly burdening the normal operation in which most file access operation are not impeded by the locks in effect.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
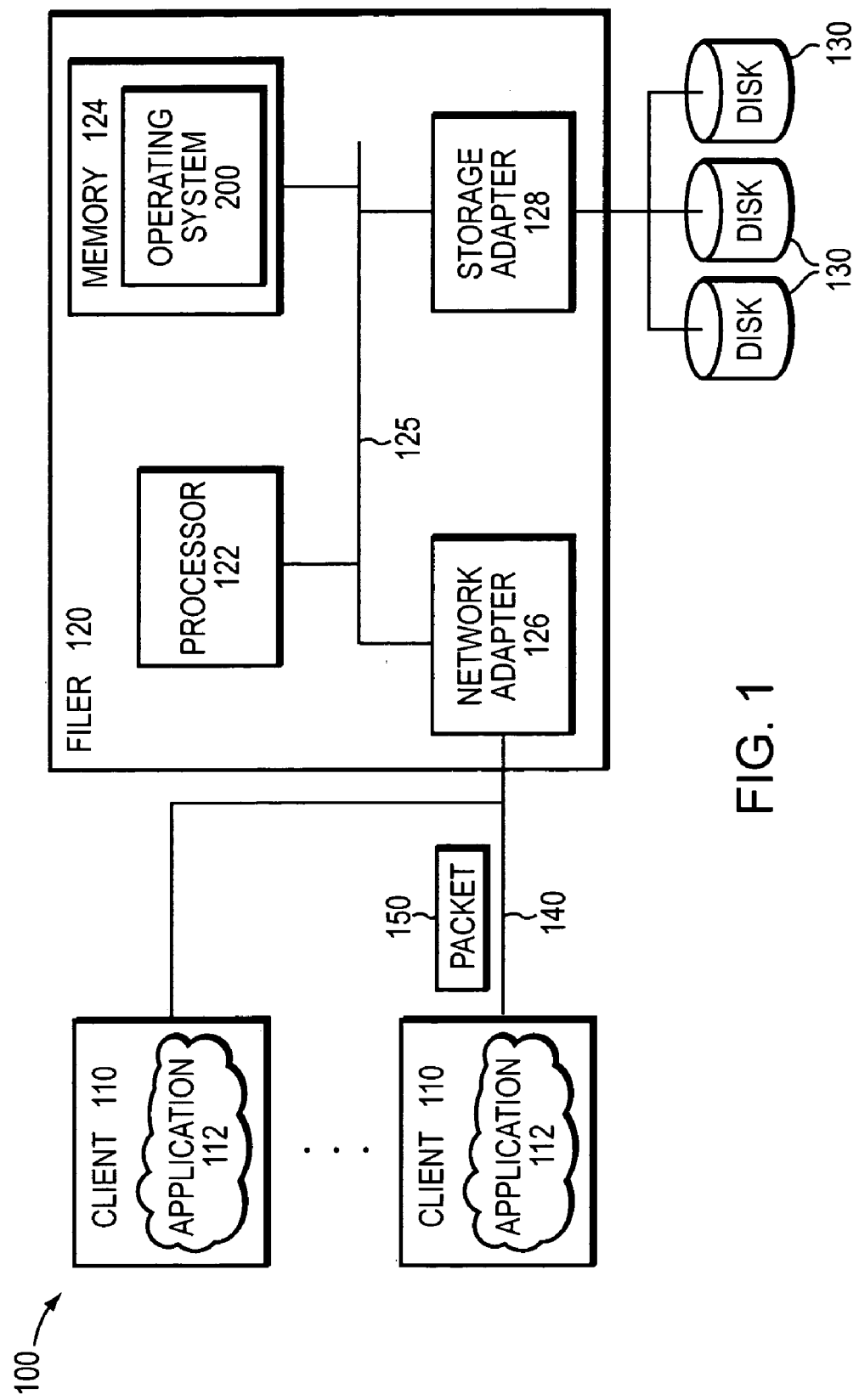
FIG. 1 is a schematic block diagram of a computer network including a plurality of clients and a file server that may be advantageously used with the present invention.

FIG. 1 is a schematic block diagram of a computer network 100 including a plurality of client systems 110 and a filer server, such as a network storage appliance, that may be advantageously used with the present invention. The file server or filer 120 is a computer that provides file service relating to the organization of information on storage devices, such as disks 130. The filer 120 generally comprises a processor 122, a memory 124, a network adapter 126 and a storage adapter 128 interconnected by a system bus 125. The filer 120 also includes a storage operating system 200 that implements a file system to logically organize the information as a hierarchical structure of directories and files on the disks.

In the illustrative embodiment, the memory 124 may have storage locations that are addressable by the processor and adapters for storing software program code and data structures associated with the present invention. The processor and adapters may, in turn, comprise processing elements and/or logic circuitry configured to execute the software code and manipulate the data structures. The storage operating system 200, portions of which are typically resident in memory and executed by the processing elements, functionally organizes the filer by, inter alia, invoking storage operations in support of a file service implemented by the filer. It will be apparent to those skilled in the art that other processing and memory means, including various computer readable media, may be used for storing and executing program instructions pertaining to the inventive technique described herein.

The network adapter 126 comprises a network interface card (NIC) having the mechanical, electrical and signaling circuitry needed to connect the filer 120 to clients 110 over computer network 100, which may comprise a point-to-point connection or a shared medium, such as a local area network. The clients 110 may be general-purpose computers configured to execute applications 112 including file system protocols, such as the Common Internet File System (CIFS) protocol. Moreover, the clients 110 may interact with the filer 120 in accordance with a client/server model of information delivery. That is, each client may request the services of the filer, and the filer may return the results of the services requested by the client, by exchanging packets 150 encapsulating, e.g., the CIFS protocol format over the network 140. The format of the CIFS protocol packet exchanged over the network is well known and described in *Common Internet File System* (CIFS) Version: CIFS-Spec 0.9, Storage Networking Industry Association (SNIA), Draft SNIA CIFS Documentation Work Group Work-in-Progress, Revision Date: Mar. 26, 2001 (hereinafter "CIFS specification"), which is hereby incorporated by reference as though fully set forth herein. It will be understood to those skilled in the art that the inventive technique described herein may apply to any server capable of providing a shared resource service to any client in accordance with various applications executing on the client communicating with server applications on a server.

The storage adapter 128 cooperates with the storage operating system 200 executing on the filer to access information requested by the client, which information may be stored on any storage media, such as the disks 130. The storage adapter includes input/output (I/O) interface circuitry that couples to the disks over an I/O interconnect arrangement, such as a conventional high-performance, Fibre Channel serial link topology. The information is retrieved by the storage adapter and, if necessary, processed by the processor 122 (or the adapter 128 itself) prior to being forwarded over the system bus 125 to the network adapter 126, where the information is formatted into a packet and returned to the client 110.

Storage of information on the filer is preferably implemented as one or more storage "volumes" that comprise a cluster of physical storage disks 130, defining an overall logical arrangement of disk space. Each volume is generally associated with its own file system. To facilitate access to the disks 130, the storage operating system 200 implements a file system that logically organizes the information as a hierarchical structure of directories and files on the disks. Each "on-disk" file may be implemented as a set of disk blocks configured to store information, such as data, whereas the directory may be implemented as a specially formatted file in which information about other files and directories are stored. In the illustrative embodiment described herein, the storage operating system is preferably the NetApp® Data ONTAP™ operating system available from Network Appliance, Inc. that implements a Write Anywhere File Layout (WAFL) file system. However, it is expressly contemplated that any appropriate file system can be used, and as such, where the term "WAFL" is employed, it should be taken broadly to refer to any file system that is otherwise adaptable to the teachings of this invention.

Figure 2:
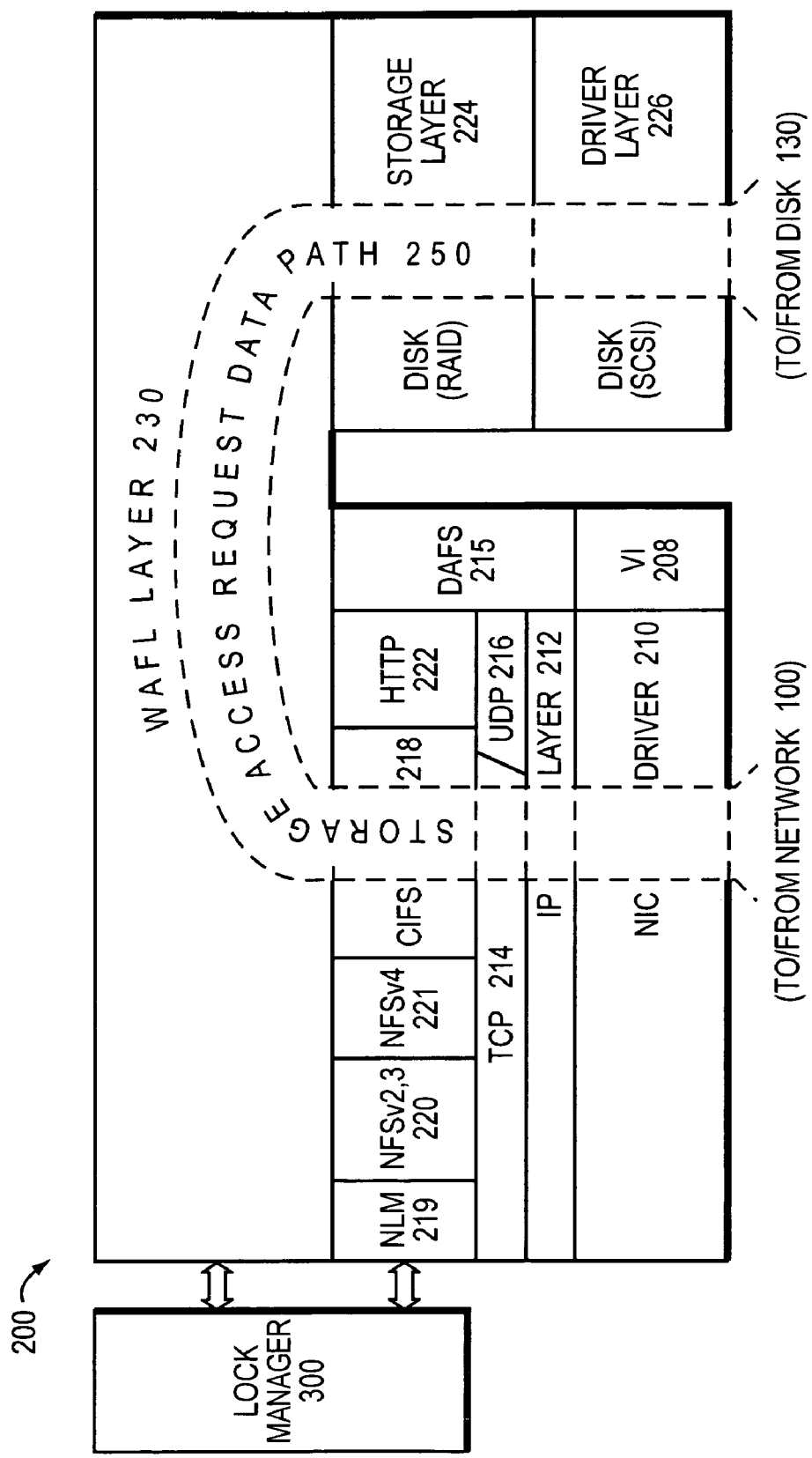
FIG. 2 is a schematic block diagram of a storage operating system that may be advantageously used with the present invention.

FIG. 2 is a schematic block diagram of the Data ONTAP operating system 200 that may be advantageously used with the present invention. The storage operating system comprises a series of software layers, including a NIC layer 210 of network drivers (e.g., an Ethernet driver) and a virtual interface (VI) layer 208 of VI device drivers. The operating system further includes network protocol layers, such as the Internet Protocol (IP) layer 212 and its supporting transport mechanisms, the Transport Control Protocol (TCP) layer 214 and the User Datagram Protocol (UDP) layer 216. A file access protocol layer provides multi-protocol data access and, to that end, includes support for the Direct Access File System (DAFS) protocol 215, the CIFS protocol 218, the network lock manager (NLM) protocol 219, the Network File System (NFS) versions 2 and 3 protocol 220, the NFS-v4 protocol 221 and the Hypertext Transfer Protocol (HTTP) protocol 222. The storage operating system 200 also includes a disk storage layer 224 that implements a disk storage protocol, such as a Redundant Array of Independent Disks (RAID) protocol, and a disk driver layer 226 that implements a disk access protocol such as, e.g., a Small Computer Systems Interface (SCSI) protocol.

Bridging the disk software layers with the network and file system protocol layers is a WAFL layer 230 that preferably implements the WAFL file system. The on-disk format representation of the WAFL file system is block-based using, e.g., 4 kilobyte (kB) data blocks and using inodes to describe the files. An inode is a data structure, e.g., a 128-*byte* structure, which is used to store information, such as meta-data, about a file. The meta-data contained in an inode may include, e.g., ownership of the file, access permission for the file, size of the file, file type and location of the file on disk. The WAFL file system uses a file handle, i.e., an identifier that includes an inode number, to retrieve an inode from disk. The WAFL layer 230 also uses files to store meta-data describing the layout of its file system. These meta-data files include, among others, an inode file.

Operationally, a request from the client 110 is forwarded as, e.g., a conventional CIFS protocol packet 150 over the computer network 100 and onto the filer 120 where it is received at the network adapter 126. A network driver of the media access layer 210 processes the packet, passes it onto the network protocol layers 212-214 and CIFS layer 218 for additional processing prior to forwarding to the WAFL layer 230. Here, the WAFL file system generates operations to load (retrieve) the requested data (and inode) from disk 130 if it is not resident "in core", i.e., in memory 124. If the information is not in memory, the WAFL layer 230 indexes into the inode file using the inode number to access an appropriate entry and retrieve a logical volume block number (VBN). The WAFL layer then passes the logical VBN to the disk storage (RAID) layer 224, which maps that logical number to a disk block number and sends the latter to an appropriate driver (e.g., SCSI) of the disk driver layer 226. The disk driver accesses the disk block number from disk 130 and loads the requested data in memory 124 for processing by the filer. Upon completion of the request, the filer (and operating system) returns a reply, e.g., a conventional acknowledgement packet defined by the CIFS specification, to the client 110 over the network 100.

It should be noted that the software "path" through the storage operating system layers described above needed to perform data storage access for the client request received at the filer may alternatively be implemented in hardware. That is, in an alternate embodiment of the invention, the storage access request data path 250 may be implemented as logic circuitry embodied within a field programmable gate array (FPGA) or an application specific integrated circuit (ASIC). This type of hardware implementation increases the performance of the file service provided by filer 120 in response to a file system request packet 150 issued by client 110. Moreover, in another alternate embodiment of the invention, the processing elements of network and storage adapters 126, 128 may be configured to offload some or all of the packet processing and storage access operations, respectively, from processor 122 to thereby increase the performance of the file service provided by the filer. It is expressly contemplated that the various processes, architectures and procedures described herein can be implemented in hardware, firmware or software.

As used herein, the term "storage operating system" generally refers to the computer-executable code operable on a computer that manages data access and may, in the case of a filer, implement file system semantics, such as the Data ONTAP storage operating system, which is implemented as a microkernel. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive technique described herein may apply to any type of special-purpose (e.g., file serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

The present invention comprises a multi-protocol lock manager 300 configured to efficiently manage granting, revoking and releasing of various types of locks on files or regions of files located on a file server, such as a filer. The various locks are associated with multiple different file access protocols (e.g., CIFS, NFS/NLM, NFS-v4 and DAFS), each having its own semantics. The multi-protocol lock manager 300 allows the filer to take appropriate actions with respect to locking requests and other file access operations issued by clients, while ensuring that the actions taken are always consistent with semantic requirements for each lock, as established by the associated file access protocol.

Figure 3:
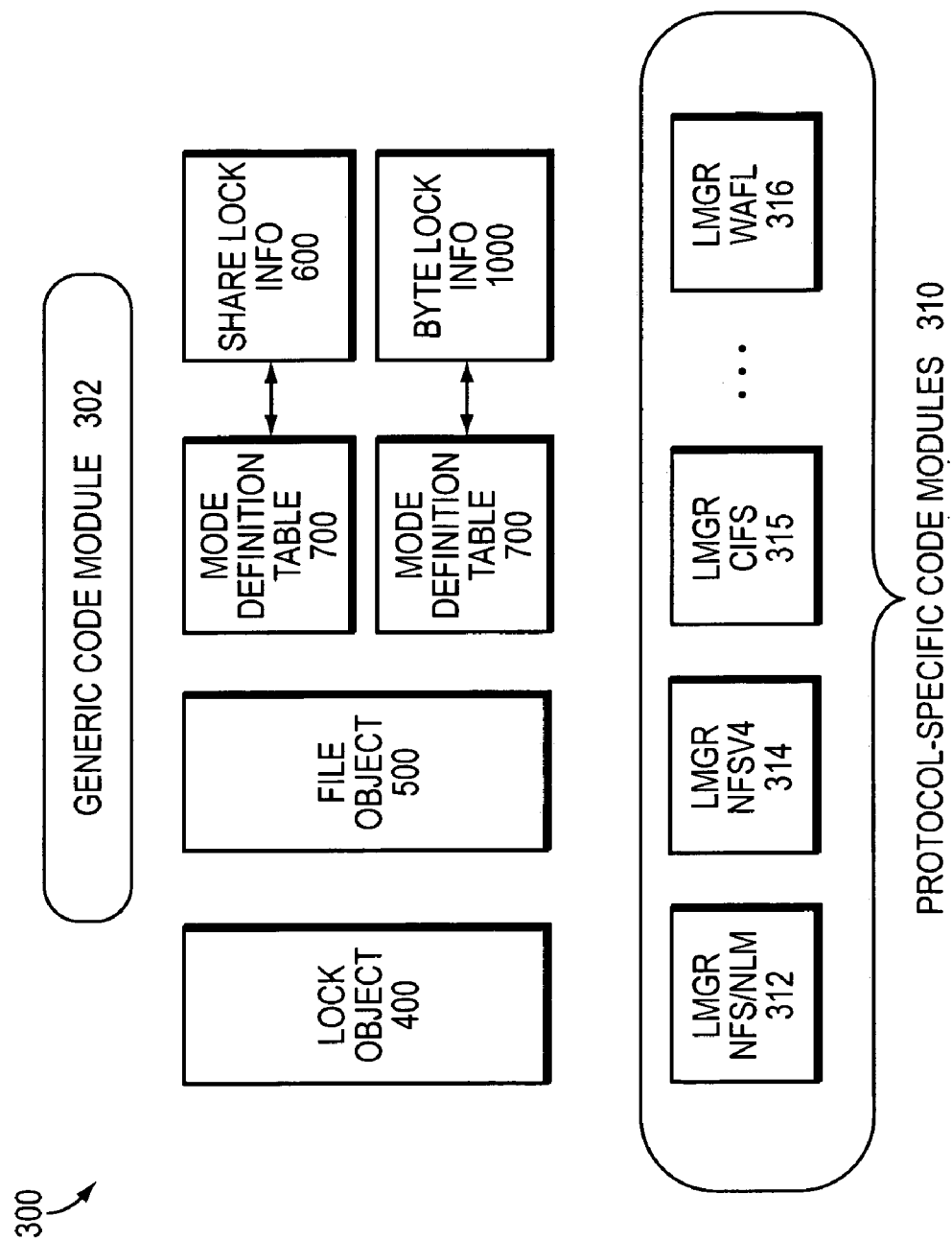
FIG. 3 is a schematic block diagram of a multi-protocol lock manager having a plurality of data structures in accordance with the present invention.

In the illustrative embodiment described herein, the multi-protocol lock manager comprises elements that cooperate to provide a general lock management service that supports the various protocols. These elements include generic and protocol-specific code modules configured to provide callouts and associated functions directed to information contained in various data structures. FIG. 3 is a schematic block diagram of the multi-protocol lock manager 300 comprising a generic code module 302, protocol-specific code modules 310 and various data structures. The data structures include a lock object 400 containing information that describes a particular lock and a file object 500 containing information that describes a file operated on by the lock manager. In addition, a sharelock info block 600 contains information describing a share lock requested from the lock manager, a bytelock info block 1000 contains information describing a byte-range lock requested from the lock manager and mode definition tables 700 contain mode definitions that are accessible by the blocks 600, 1000.

The protocol-specific code modules 310 include an LMGR NFS/NLM module 312, an LMGR NFSv4 module 314, an LMGR CIFS module 315 and an LMGR WAFL module 316. Each protocol-specific module 310 is configured to handle locks according to its specific file access protocol; however, the LMGR NFSv4 module 314 supports the DAFS protocol as well as the NFS-v4 protocol, because both protocols handle locks in a substantially similar manner. Each protocol-specific module 310 further defines protocol-specific data structures, such as an info structure and a corresponding owner structure. Broadly stated, the lock object 400 contains a union of all of the info structures, each of which has a first entry indicating the corresponding owner structure. The remaining entries beyond that initial entry are initialized to zero when a lock for the protocol is created and are available to record changes in the status of the lock or to otherwise keep track of it. The owner structure defines the parameters that are passed for the created lock. These parameters include information about the owner, but may also include other protocol-specific information governing how the lock is handled by the various protocol-specific callouts.

The relation between generic and protocol-specific code is such that, e.g., locks are translated into a protocol-independent form by code "outside" the lock manager proper. The protocol-specific code modules 310 comprise protocol code located outside the lock manager and adapted for interaction with (i.e., calling by) the various file access protocols of storage operating system 200. For example, assume a conventional file access protocol request, e.g., a CIFS request for a lock of a particular type, containing protocol-specific information is issued by a client 110 and received at the filer 120. The request is passed to the file access protocol layer of the storage operating system 200, e.g., the CIFS protocol layer 218, where that code translates the protocol-specific information into a form that is understandable by the multi-protocol lock manager 300.

In particular, the CIFS protocol code interprets the CIFS request format and interacts with the lock manager via an LMGR CIFS protocol-specific code module 315. Once the lock manager is "called", protocol specific data is accessed only through per-protocol callout routines. That is, if a specific action needs to be invoked by the lock manager 300 and implemented by protocol-specific code 315, a callout routine ("callout") to that protocol-specific code is invoked. This arrangement allows the lock manager to avoid direct reference to protocol-specific data structures used to execute the requested callouts.

In accordance with the invention, the multi-protocol lock manager 300 decides whether to grant, refuse to grant, or wait for the appropriate time to grant the requested lock. This decision respects protocol-defined constraints on the kinds of locks that may be simultaneously granted for a given file. If the requested lock is revocable (e.g., a CIFS oplock), the lock manager further determines when the lock needs to be revoked because of a conflicting locking request or other conflicting file access operation. Although the specific file access protocol is responsible for actually revoking the lock, the lock manager allows the file access protocol's semantic requirements to be effected via specific calls to terminate the revocation process. The protocol-specific code may eliminate the revoked lock, make it un-revocable, or replace the lock with a set of one or more other locks.

Each protocol-specific module 310 may store information to be used by the callouts in a union within the lock object 400. In addition, each protocol module 310 also has a data structure that contains callouts for that protocol module. A few additional items of data such as the length of the owner structure are located in this latter structure as well. Examples of the callouts include same_client, same_owner, setup_wait, finish_wait, and revoke_soft callout routines. For instance, handling of wait requests is different among the various protocols; therefore, initiation of a wait is handled by a per-protocol callout, e.g., the setup_wait callout. When the wait is resolved, the finish_wait callout is made so the protocol can proceed with its operation.

In many cases, the file access protocol code delegates the operation of obtaining locks to program code executing in the WAFL layer 230 for processing using a load/modify model of the WAFL file system. An exception involves the NLM protocol, which makes its locking requests directly without involvement of the WAFL layer 230. In the illustrative embodiment, the WAFL file system framework (including the load/modify model) is used for file system operations; often, locking and file system operations interact and are thus difficult to separate with respect to, e.g., execution of an open request. For example, information, such as access (read, write, both) or denial (none, read, write, both) pertaining to the open request, may be loaded into an internal (WAFL) message and forwarded to the WAFL layer code, which uses the information to compute a mode index. This mode index is then loaded into the sharelock info block 600 and used by the lock manager 300 to obtain a correct entry of the appropriate mode definition table 700 and, as described herein, a correct action disposition.

When locking requests are made via, e.g., WAFL messages presented to the WAFL file system, the lock manager provides special facilities that are invoked on behalf of multiple protocols. In addition to being called for operations that request or release locks, the lock manager is also called to determine whether an existing lock obviates a file access operation. To that end, the lock manager determines whether that operation should fail or whether the lock should be revoked and the operation made to wait for the revocation. Notably, these decisions are made without unduly burdening the normal operation in which most file access operation are not impeded by the locks in effect.

Waiting for locks fits within the WAFL framework by suspending and restarting the WAFL message when the lock has been granted (or denied in the case in which a revocation resolves a lock request negatively). A lock (object) that is waiting references (points to) a special lock wait data structure (shown at 1600 of FIG. 16). The lock wait structure points to the suspended WAFL message and data. A flags field of the WAFL message has a bit set to indicate that when this message is restarted and another attempt is made to obtain the lock, the message reconnects to the associated lock object, which is found using hash links for wait objects. The wait objects are linked by timeout value. When a wait is begun, the protocol can decide on a timeout value. When the timeout expires, the wait is terminated and the message restarted. When the message reconnects to the lock object, its state will indicate that the request timed out (which will normally be treated as denial).

When the request is restarted, the wait object is requested for a second (very short) timeout. This is because it cannot be ensured that the restarted request will follow the same path on restart; in fact, it might not even request a lock. Thus, a mechanism is needed to ensure that locks do not "leak" in this case. The second timeout affects this. If the restarted request is dilatory, it may, when restarted, not get the lock object originally allocated for it. Instead, it tries again to get the lock request normally, on the same basis as it did before the wait.

The novel lock manager is generally based on a locking model that is sufficiently flexible to support the semantics needed for the illustrative file access protocols and that can be extended for other protocols in a "clean" way. As described herein, the locking model directly accommodates opportunistic locks ("oplocks") and delegations by representing them as revocable or soft locks. A soft lock is revocable by making a protocol-specific callout. This callout returns immediately (i.e., without waiting) but will schedule actions that ultimately release the soft lock. Despite the fact that the soft lock will be released, the protocol-specific code may choose to substitute one or more un-revocable or hard locks whose union is no stronger than the soft lock being replaced, as described herein. Any such substitution can occur without conflict given that the soft lock being replaced is compatible with all existing locks.

Lock Compatibility

A lock compatibility model allows the lock manager to decide when a request for a lock should be granted, revoked or released in a protocol-independent manner. The role of the file access protocol (or of the file system code acting on behalf of the protocol) is to define and specify the appropriate locks in a protocol-independent manner. This allows the compatibility of lock requests from various file access protocols to be determined without having to reference the particular protocols with which the specific lock request are associated. According to the invention, locking requests are defined in terms of actions, each of which defines a class of actions that may be performed on the file or continuing states that may exist for the file (or may be prevented). Each action is associated with a bit position, allowing action sets to be specified as bit masks.

The novel lock manager 300 supports two basic kinds of locks: share locks that apply to an entire file being locked and byte-range locks that apply to a contiguous set of offset values for the file. To that end, the lock manager includes the sharelock info block data structure 600 containing information describing a share lock requested from the lock manager and the bytelock info block structure 1000 containing information describing a byte-range lock requested from the lock manager. The offset values of the byte-range locks could be as small as one byte or as large as the entire range of possible offset values (from 0 to $26^4-1$). Each byte-range is associated with a given range and may be exclusive or shared.

Lock compatibility constraints define the set of locks that may simultaneously be invoked for a file. The lock manager 300 implements its compatibility constraints using two separate methods. The first, lock disposition compatibility, applies to both share locks and byte-range locks. As used herein, the term "lock disposition compatibility" refers to the compatibility of two locks defined by the compatibility of their associated action sets and, in that sense, may be considered synonymous with action disposition compatibility described herein. The second, lock range compatibility, applies only to byte-range locks.

For a lock to be granted, it must be compatible with all currently granted locks for each applicable compatibility constraint. All byte-range locks are defined so that any two byte-range locks are action disposition compatible. As a result, for a share lock to be granted it must be action disposition compatible with all existing share locks and all byte-range locks for that file. For a byte-range lock to be granted it must be action disposition compatible with all existing share locks and, further, it must be lock-range compatible with all existing byte-range locks for the file. Two byte-range locks are lock-range compatible if their ranges are disjoint or they are both shared.

The sharelock info block 600 and bytelock info block 1000 cooperate to form an interface between the lock manager 300 and the storage operating system 200. In addition, each of these structures contains index values for accessing mode definition tables 700 containing mode definitions described herein. In the illustrative embodiment, each file access protocol configures fields within the sharelock info block 600 and bytelock info block 1000 to enable selection of appropriate mode definition entries of the tables 700. In the case of byte-range locks, configuration of these fields is inherent in the options chosen. For example, the NFS/NLM protocol "knows" its locks are advisory so it doesn't set a mand flag (1014 at FIG. 10). On the other hand, the CIFS protocol 218 knows its locks are mandatory and covered so it sets the appropriate bits. The result is assertion of proper bits of a mode index that leads to the correct mode definition.

In the case of share locks, the multi-protocol lock manager 300 exposes definitions for all appropriate types of locks. For example, there is a mode index defined for CIFS oplocks. In many cases, a mode index range is defined, which allows the exact mode to be computed by the protocol based on parameters within the request. Thus, for a typical CIFS open request, there is a range of sixteen (16) mode indices reserved. The CIFS protocol computes the actual mode index by, e.g., adding the start of that range to the CIFS denial mode multiplied by four and then adding the CIFS access mode. Each of the last two items have a code (0=none, 1-read, 2=write, 3=read-write) which is nominally protocol-specific, but since every protocol having such an encoding uses the same one, the encoding is assumed by the generic lock manager code 302.

Lock Object

Figure 4:
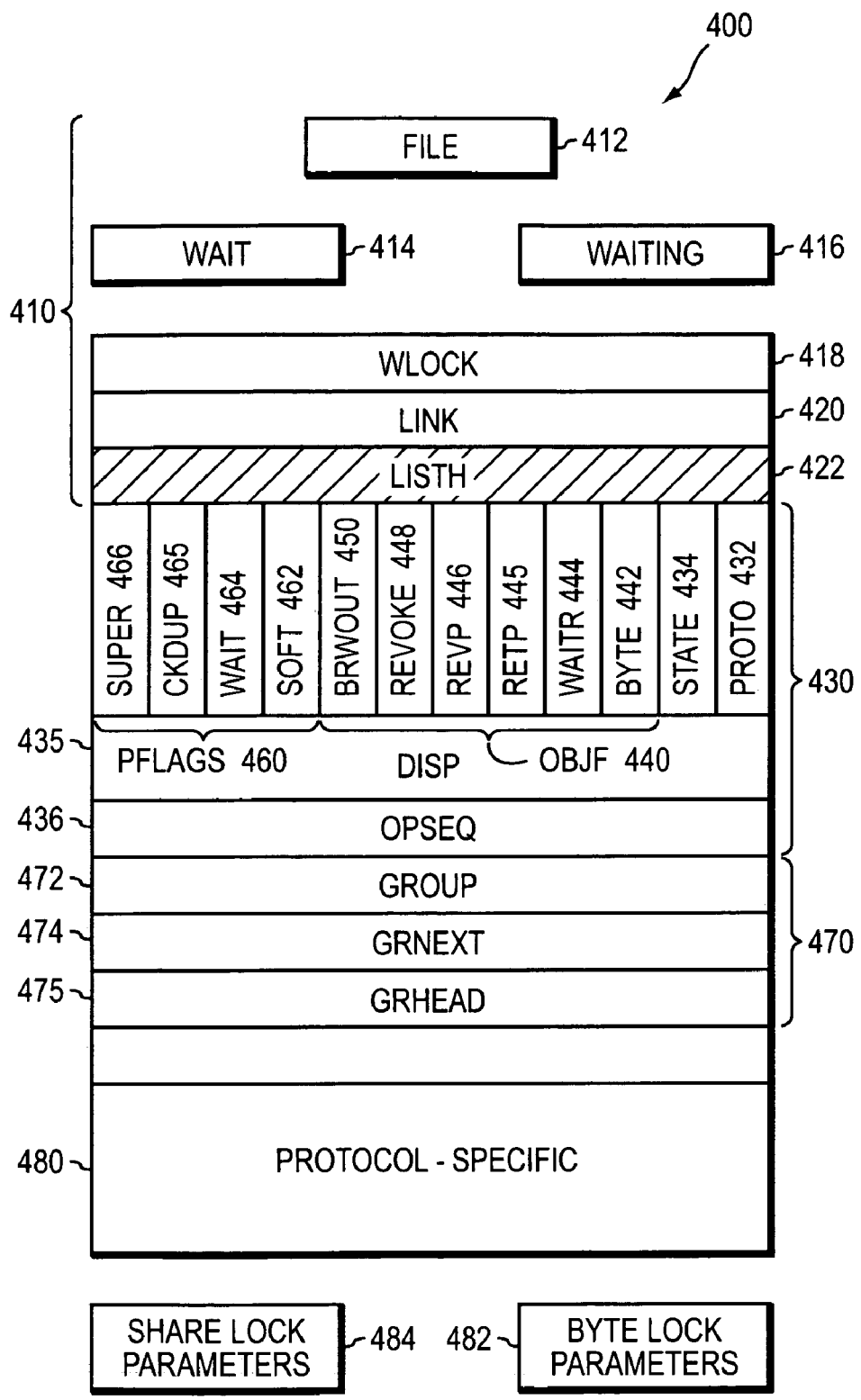
FIG. 4 is a schematic block diagram illustrating the format of a lock object data structure of the novel lock manager.

FIG. 4 is a schematic block diagram illustrating the format of the lock object 400. The lock object is a data structure containing information that describes a particular lock, whether granted, waiting to be granted, being revoked, etc. The lock object 400 is private to the lock manager 300 and, thus, cannot be referenced outside of the lock manager. Notably, the lock object 400 contains protocol-specific data; however, it should be noted that protocol-specific fields can only be accessed in corresponding protocol-specific code 310 within the lock manager.

Specifically, the lock object includes a basic linkage section 410 comprising a plurality of fields, including a file field 412 containing an address of the file object structure 500. A wait field 414 contains an address of the lock wait structure 1600 used to manage the process of waiting for and timing out a particular waiting lock, whereas a waiting field 416 contains an address of the first of a list of byte-range locks. These byte-range locks are incompatible with the current grant byte-range lock and are essentially waiting for the current lock to be released, in order to be granted. This address and the previous address are alternatives, and either one or the other is present based on the state of the lock.

A wlock field 418 contains an address of the lock object for a byte-range lock on which a current lock is waiting. Otherwise, if the current lock is not a byte-range lock, not waiting or not waiting on a queue associated with a lock object, the content of this field is NULL. A link field 420 contains an address of next and previous lock objects in the list within which the lock object is located. This might be one of the lists in a file object 500 (for granted locks or locks on a share-wait list) or the waiting list associated with another byte-range lock. A listh field 422 contains an address of a list on which the current lock is enqueued. Note that the data item of this latter field is present only when complied for DEBUG.

A lock state section 430 comprises fields generally devoted to managing the lock state. In particular, a proto field 432 contains a number of the specific protocol associated with the lock. A state field 434 contains a current state of the lock indicating, inter alia, whether the lock is granted, waiting to be granted, waiting for either granting or denial or being revoked. A disp field 435 contains an action disposition for the current lock and an opseq field 436 contains a 64-bit quantity used to mark a set of lock objects, such as the set of locks that need to revoked for a given request. A global operation sequence can be incremented to produce a unique opseq value which can then be used to mark lock objects as they are found, so that they can be revoked in a later scan.

An objf section 440 contains a plurality of flags, including a byte flag 442 that is asserted if the lock object represents a byte-range lock and a waitr flag 444 that is asserted if there is a wait object which references the lock object, but is not referenced by this object. A retp flag 445 is asserted to indicate the object should be returned when the reference from the wait object is gone, whereas a revp flag 446 is asserted to indicate that a revoke is pending which should be made effective when the reference from the wait object is gone. A revoke flag 448 is asserted to indicate revoke processing for this object and a brwout flag 450 is asserted if the lock is a byte-range lock that may have a waiting byte-range lock including bytes outside the span of the original lock. In addition, a pflags section 460 contains a plurality of general parameter flags from the sharelock info or bytelock info structure, including soft 462, wait 464, ckdup 465 and super 466 flags, as described further herein.

A general lock section 470 comprises fields related to a general lock grouping facility (described further herein) and includes a group field 472 containing an address of a lock group to which the current lock belongs. A grnext field 474 contains addresses of next and previous lock objects associated with the same lock group and a grhead field 475 contains an address of a group list into which the lock should be linked. Note that this latter field is present only when complied for DEBUG. In addition, a protocol-specific field 480 is used by the various illustrative file access protocols, each in its own fashion, and is not referred to by the generic lock manager code 302. Depending upon whether the lock is a byte-range or a share lock, appropriate locking parameters, e.g., bytelock parameters 482 or sharelock parameters 484, appear at the end of the lock object 400.

Figure 16:
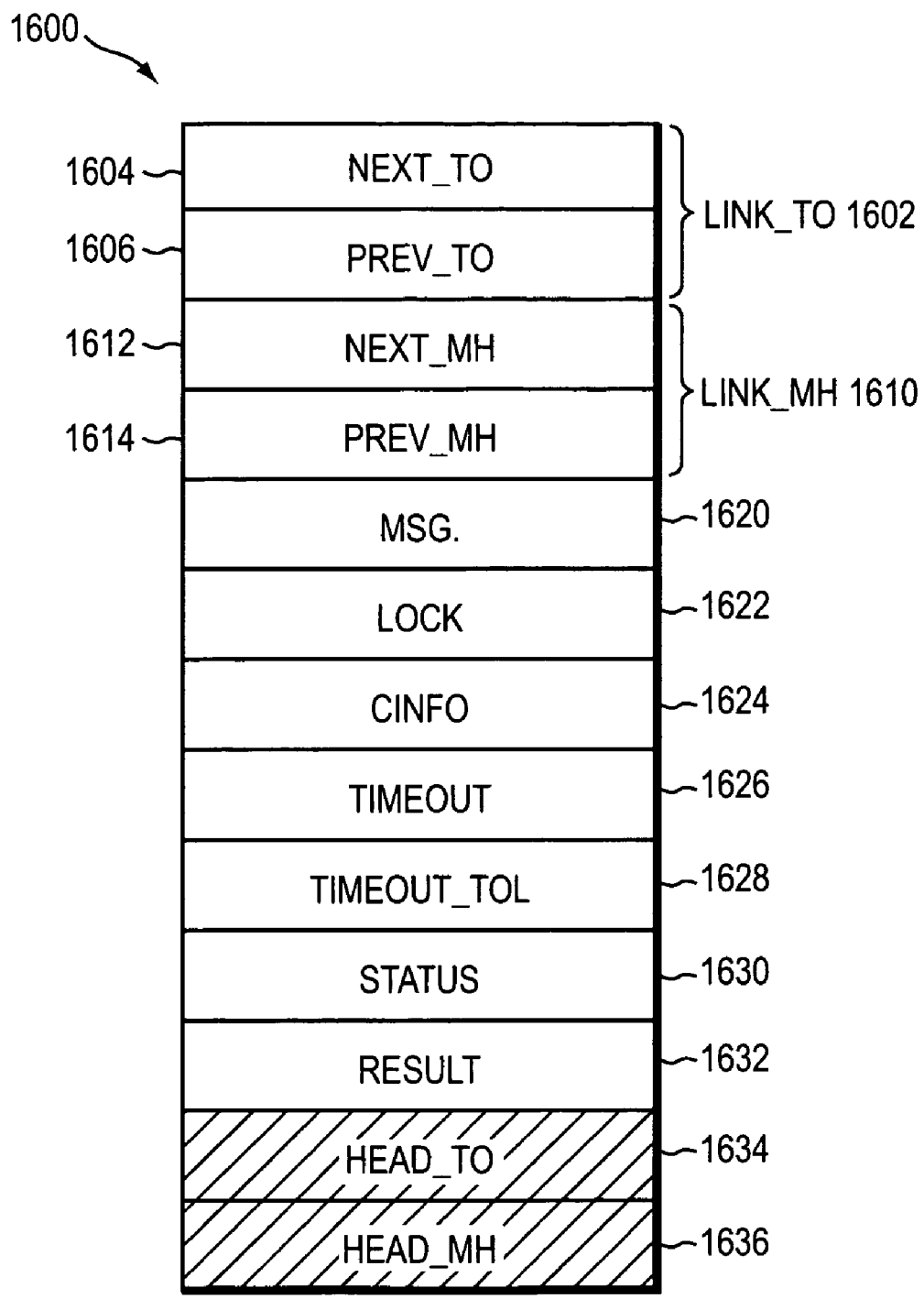
FIG. 16 is a schematic block diagram illustrating the format of a lock wait data structure in accordance with the present invention.

FIG. 16 is a schematic block diagram illustrating the format of the lock wait structure 1600 in accordance with the present invention. The lock wait structure is used to help keep track of waiting lock requests in those cases in which the waiting lock was requested by code in the WAFL layer 230. This applies to requests for a number of the specific protocols handled by the lock manager 300 (i.e., NFS-v4, CIFS, WAFL). Because the setup_wait and finish_wait routines are per-protocol callouts, each protocol is free use the structure 1600 for all, for some, or for none of its locks. In the illustrative embodiment, the lock wait structure is used where, and only where, the lock requests are made in the WAFL layer 230.

The lock wait structure 1600 includes a link_to field 1602 containing two pointers or links that reference the next lock wait structure (next_to 1604) and the previous lock wait structure (prev_to 1606) in an associated timeout queue. There are two timeout queues. The first is for those that actually have a timeout value assigned (i.e. a maximum time for the wait or a sub-phase thereof, as explain below with status, after which the wait or the associated sub-phase will end). That timeout queue is ordered by ascending actual time of expiration. There is a second (pseudo)-timeout queue, the "forever" queue that consists of lock wait structures that have no timeout (with no special order constraints).

A link_mh field 1610 contains links to the next lock wait structure (next_mh 1612) and previous lock wait structure (prev_mh 1614) in a circular list of all of the lock wait structures 1600 whose associated message address (see below) hashes to the same value. The list is organized by message hash and allows the lock wait structure to be found relatively easily given the address of the associated message. Free (unused) lock wait structures are located in their own circular list, identical in form the message hash list but separate from them. A msg field 1620 contains the address of a message (Msg) structure associated with a WAFL request. All WAFL requests have an associated Msg structure representing the request in question. This Msg structure is the one making the lock request and which will be restarted when the lock is available (or has been denied).

A lock field 1622 contains the address of the waiting lock object and a cinfo field 1624 contains a void (i.e. type-unspecified) pointer to an area where information about a conflicting lock (in the denial case) may be stored. This field is type-unspecified since the form of conflict information varies with the protocol (the protocol of the requesting lock in this case). A timeout field 1626 contains an unsigned 64-bit quantity which indicates (in terms of milliseconds from system boot) the wait is to expire, if the wait has a timeout and a timeout_tol field 1628 contains an unsigned 32-bit quantity which gives, in milliseconds, a timeout tolerance (i.e. an acceptable variation in the actual time a timeout is recognized). By specifying a tolerance, the code may optimize the timeout logic by batching timeouts while staying within the specified tolerances.

A status field 1630 describes the status of this wait request. There are four possible values: (1) FREE indicating that the lock wait structure is unused and should be in (using link_mh 1610) the free list. (2) WAIT indicates that the lock wait structure is waiting for lock to be granted (or denied) with an associated timeout. Here, the lock wait structure should be in (using link_mh 1610) a message hash list based on the hash of the address of the associated message and it should be in (using link_to 1602) the timeout list. (3) FOREVER indicates that the lock wait structure is waiting for a lock to be granted (or denied) with no associated timeout. The lock wait structure should be in (using link_mh 1610) a message hash list based on the hash of the address of the associated message and it should be in (using link_to 1602) in the forever list. (4) PICKUP indicates that the lock wait structure in which the original wait for the lock being granted has been terminated (whether by granting the lock, denying the request, or timing out the wait), and the lock has not been picked up (i.e. found by msg address 1620) by the restarted WAFL request. Such locks are subject to being released (and the associated structures freed) if, for any reason, the lock is not picked up in a timely fashion. Thus lock wait structures with this status are subject to a separate pickup timeout. The lock wait structure should be in (using link_mh 1610) a message hash list based on the hash of the address of the associated message and it should be in (using link_to 1602) in the timeout list.

A result field 1632 contains a result code for the request (e.g. GOTTEN, DENIED, TIMEDOUT), when the wait completed. A head_to field 1634 contains an address of the timeout queue on which this structure is enqueued. This address is the address of the timeout queue when the status is WAIT or PICKUP, the address of the forever queue when the status is FOREVER, and NULL when the status is FREE. A head_mh field 1636 contains an address of the message hash list on which this structure is listed. This address is the address of one of the lists organized by the hash of the msg address 1620 when the status is WAIT, FOREVER, or PICKUP. It will be the address of a free list when the status is FREE. These last two fields are DEBUG-only.

File Object

Figure 5:
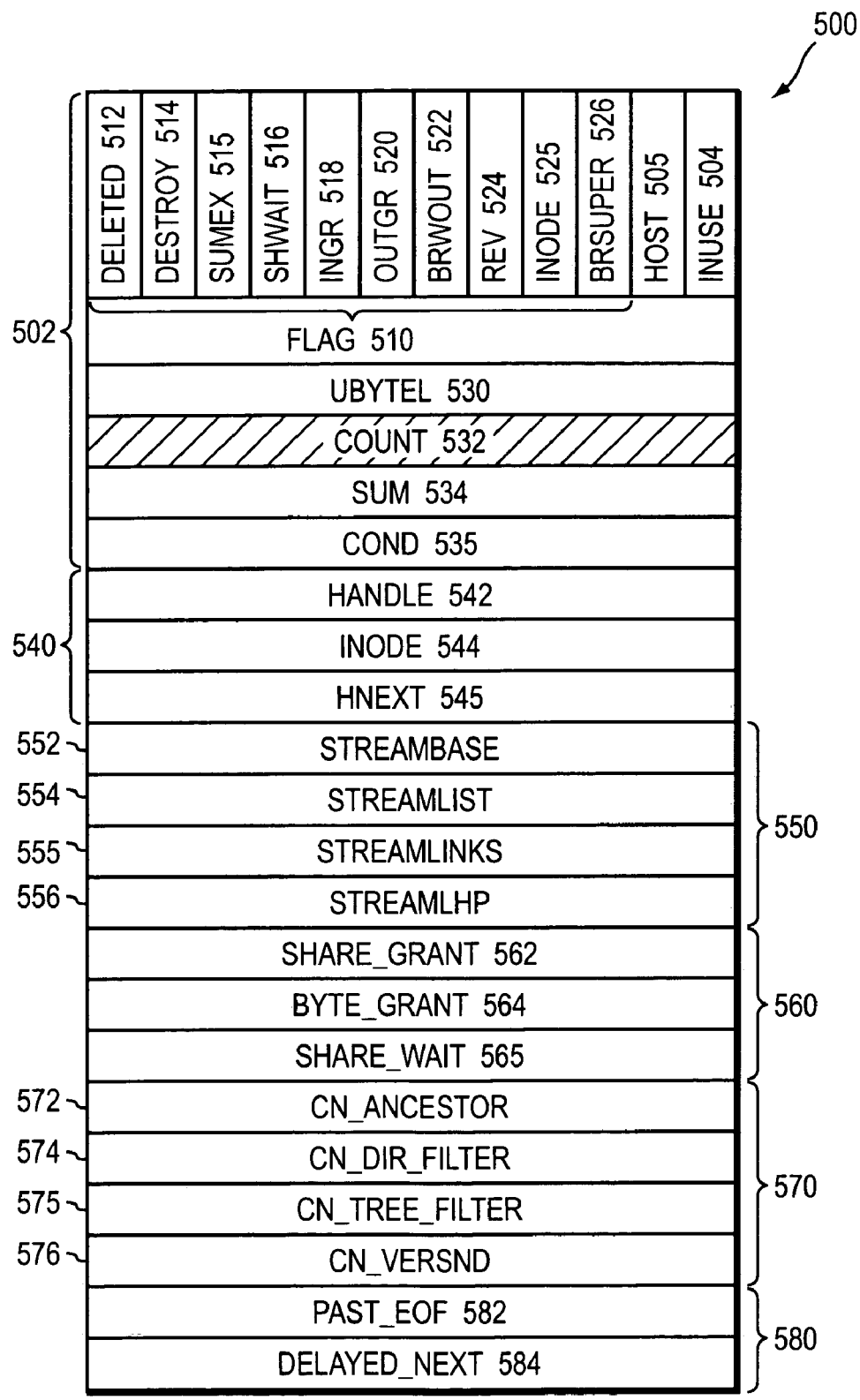
FIG. 5 is a schematic block diagram illustrating the format of a file object data structure of the novel lock manager.

FIG. 5 is a schematic block diagram illustrating the format of the file object 500. The file object structure is a data structure describing a file operated on by the lock manager 300. This structure is generally part of the internals of the lock manager that is not accessible although, in the illustrative embodiment, the file object may be accessed outside the lock manager. Nevertheless, the fields that relate to managing locks are preferably only modified in the lock manager. The file object 500 comprises a general status section 502 having fields devoted to general status information and include an in-use field 504 is a one-byte field set to a non-zero value if this object is actually in use, as opposed to being on a free list. A host field 505 is a one-byte field set to indicate whether this file object is associated with the local host or with takeover of a partner, in a cluster configuration.

A flags section 510 is a two-byte field containing file object flags, including a deleted flag 512 indicating that the file is marked for deletion and a destroy flag 514 indicating that the file is scheduled for destruction, although destruction is generally delayed pending release of pre-allocated blocks. A sumex flag 515 indicates that a summary disposition (described further herein) exactly reflects all granted locks. When this bit is off, the summary disposition may be a superset of the bits contained in all granted locks. A shwait flag 516 is asserted to indicate that there may be one or more locks on the share-wait list that is waiting in a fashion such that the wait terminates by denial of the request (as opposed to grant or timeout). This situation necessitates that granting of a lock may require a scan of the share-wait list.

An ingr flag 518 indicates that, when processing requests for this file, it is to be considered whether processing occurs during the grace period following server reboot. An outgr flag 520 indicates that, when processing requests for this file, it is to be considered whether processing occurs outside the grace period following server reboot. A brwout flag 522 is asserted if there are (or may be) one or more byte-range locks waiting to be granted, when the range of the waiting lock includes bytes other than those covered by the conflicting lock on whose queue the waiting lock is located. A rev flag 524 is asserted if a revoke routine is called for a soft lock and that routine has not yet returned control. An inode flag 525 is asserted to indicate that, at one time, this file object was connected with its corresponding file system on-disk structure (i.e., an inode). A brsuper flag 526 is asserted to indicate that a byte-range super-lock might currently be granted.

An ubytel field 530 contains a count of uncovered byte-range locks on this file that are granted and a count field 532 contains a count of associated locks (used for debugging). A sum field 534 contains an action summary used to conveniently summarize the action disposition of granted locks for this file. As described herein, action summaries are maintained on a worst-case basis, so that they are at least as strong as the combination of dispositions of all (and respectively all "hard") locks. Thus when a lock is compatible with these dispositions, it can be granted without scanning all locks. The sumex flag 515 indicates, as noted above, whether the summary is known to be equal to the union of all locks, as opposed to merely being no weaker. A cond field 535 contains an action set consisting of file-related conditions used to initialize the active sets within the action dispositions of the sum field. They should be derivable from the flags section.

A relation section 540 contains fields devoted to identification of a specific file and its connection with related external data structures. A handle field 542 contains a file handle for this file. Note that, in the illustrative embodiment, this is a WAFL file handle in the storage operating system 200, but it is understood that the file handle could be any data structure that allows the file in question to be uniquely identified. An inode field 544 contains an address of a WAFL inode for this file if present in memory 124 and NULL if it is not. Again, this address could be any data structure that contains file system related information about the file. An hnext field 545 contains an address of a next file object in a hash list with file objects assigned to hash chains based on a hash of the file handle.

A streams section 550 comprises fields that support streams, which are named data items associated with a given file, apart from the normal data associated with the file. A streambase field 552 contains an address of the file object for the associated base file, if this is a stream; otherwise, the content of the field is NULL. A streamlist field 554 contains an address of a first file object associated with streams and associated with this base file, if this file object is for a base file. Otherwise, the field is NULL. A streamlinks field 555 contains addresses of next and previous file objects for streams associated with the same base file, if this file object is for a stream. A streamlhp field 556 contains an address of a stream list head on which this file object is enqueued. This latter item is only present when compiled for DEBUG.

A lock list section 560 comprises fields devoted to lists of locks associated with this file object. The file object 500 maintains three lists for the locks associated with a file. Each of the lists is maintained as a bi-directional circular list of lock objects with the file object containing a pointer to the first lock object. It should be noted that, in the case of waiting locks, such locks are not divided, as are granted locks, by the type of lock (share of byte-range). Instead, these locks are divided by the compatibility mechanism currently preventing the lock from being granted. Thus the share-wait list may contain both share locks and byte-range locks. In addition, locks prevented from being granted by the byte-range compatibility (which may only be byte-range locks) are not listed directly in the file object but instead are maintained on specific lists based on the individual lock object that they conflict with, with the list head contained within that lock object.

A share_grant field 562 contains a list of all granted share locks that are actually in effect for the file. A byte_grant field 564 contains a list of all granted byte-range locks that are in effect for the file, ordered by starting offset for the range and, when starting offsets of locks are identical, by ending offset. Each lock in the byte-grant list has its own list of conflicting waiting byte-range locks. This structure allows simpler turnover of byte ranges from one lock to another than if a single list of waiting byte-range locks for a file is maintained. When a waiting lock conflicts with more than one existing byte-range lock, the waiting lock may be on the wait list associated with any of the conflicting locks. A share_wait field 565 contains a list of all locks waiting to be granted (or possibly denied) when there is an action disposition incompatibility with the set of currently granted locks. Note that the share_wait list can include byte-range locks as well as share locks.

A change-notify section 570 comprises fields used to support CIFS change-notify. Relevant fields are illustratively manipulated external to the lock manager and include a cn_ancestor field 572 containing an address of the file object for a next higher-level directory for which change-notify processing is requested. A cn_dir_filter field 574 contains a mask of change-notify conditions that are to be reported for the current directory. A cn_tree_filter field 575 contains a mask of change-notify conditions that are to be reported for the current directory and all directories below it in a file name tree. A cn_versno field 576 contains a change-notify version number used to prevent erroneous processing of outdated change-notify requests.

A pre-allocation section 580 comprises fields used to help support block pre-allocation for CIFS. Here, a past_eof field 582 contains a number of blocks allocated past the end-of-file and a delayed_next field 584 contains a pointer that references a next file object in a list of such objects scheduled for delayed destruction since the associated block past_eof must be released first.

Bytelock and Sharelock Blocks

Figure 10:
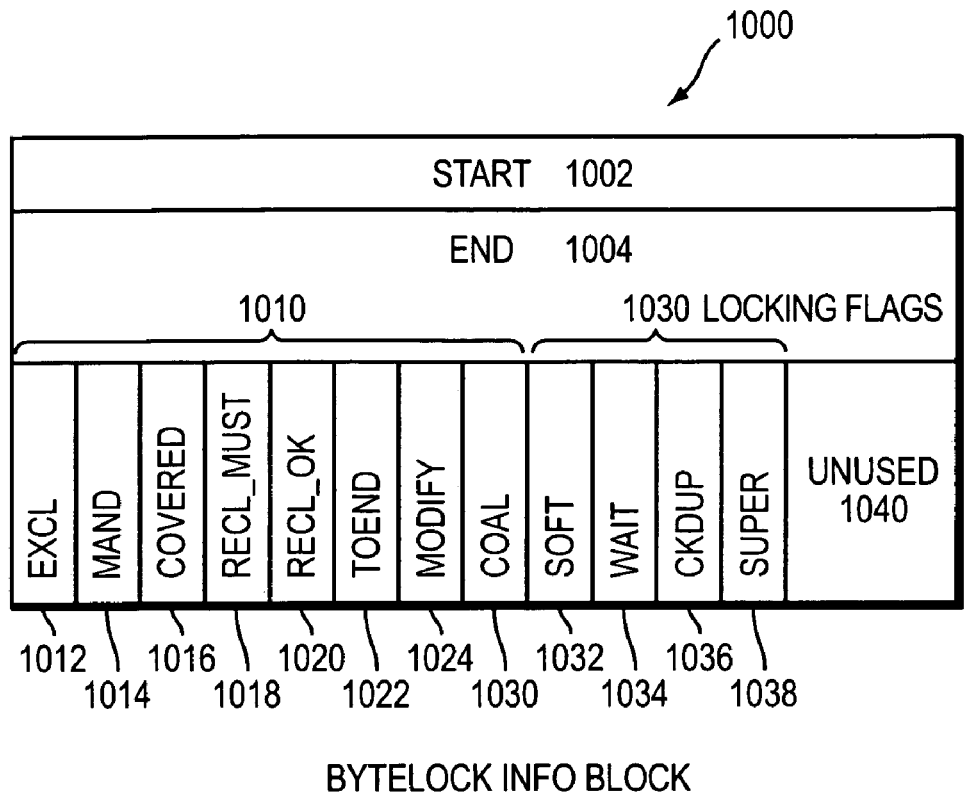
FIG. 10 is a schematic block diagram illustrating the format of a bytelock info data structure of the novel lock manager.

FIG. 10 is a schematic block diagram illustrating the format of the bytelock info block 1000 that may be advantageously used with the present invention. A start field 1002 containing a 64-bit unsigned quantity offset of the start of the range being locked and an end field 1004 containing a 64-bit unsigned quantity offset of the end of the range being locked. A byte-range lock flags field 1010 contains a plurality of byte-range locking flags. These flags are combined and used as an integer quantity to index into a table of mode definitions, similar to the manner in which the contents of the mode field 602 are used for share locks.

Specifically, an excl flag 1012 indicates an exclusive byte-range lock, as opposed to one for shared access. Byte-range locks for exclusive or shared access are often referred to as locks for write and for read, respectively. A mand flag 1014 indicates a mandatory byte-range lock, as opposed to one that is advisory. Mandatory byte-range locks prevent conflicting I/O operations in their range while advisory locks do not do so, and merely prevent conflicting locks from being granted. A covered flag 1016 indicates a lock that is covered by a corresponding open request. Covered byte-range locks are presumed to be associated with a corresponding share lock (i.e., an open request) which establishes the environment in which they are requested and/or granted, while uncovered byte-range locks have no such associated covering open request. Uncovered byte-range locks are typically associated with stateless protocols, such as NFS-v2 and NFS-v3, which contain no concept of open requests within the protocols.

A recl_must flag 1018 indicates a lock "reclaim" request that must be issued during a grace period (following server reboot) so that any attempt to request the reclaim beyond the grace period is rejected with an error. Lock reclaim requests are issued by protocols (such as NFS-v4) that support the concept of lock reclamation, but that define the concept strictly. Such a strict definition avoids the possibility that a lock reclamation request might be granted in circumstances in which a conflicting lock had previously been granted, thus allowing the client to act as if it had continuously retained a lock when, in fact, it was lost because a conflicting lock was granted after the grace period ended.

A recl_ok flag 1020 indicates that a lock reclaim request may be issued during the grace period (following server reboot) or after it completes. These lock reclaim requests are issued by protocols (such as NLM) that support the concept of lock reclamation, but do not define it strictly. Such a non-strict definition allows situations in which reclamation requests may be granted even if it is possible that a conflicting lock was granted during pendency of the original lock. Flag 1022 is a toend flag, whereas flag 1024 is a modify flag indicating that a current request may modify (i.e., upgrade or downgrade) an existing lock for the same owner, either in whole or in part (i.e., with the upgrade or downgrade only applying to a sub-range of the range of the existing lock). A coal flag 1026 indicates that a granted lock is to be coalesced with adjoining identical locks for the same owner.

A general locking flags field 1030 contains a plurality of general locking flags, including a soft flag 1032 that indicates a soft or revocable lock. A wait flag 1034 specifies that if the current lock is not granted, the request should wait for it to be granted, subject to protocol-implemented limits on wait times and other special conditions which may terminate or suppress waiting. A ckdup flag 1036 indicates that a check should be made for duplicates of existing locks when granting a lock. Note that this check may require a scan of existing locks, even when there is some degree of certainty that there are no conflicts. A super flag 1038 indicates that the lock to be created (and granted) is a super-lock, the presence of any conflicting locks notwithstanding. The remaining bits of field 1040 are unused.

Figure 6:
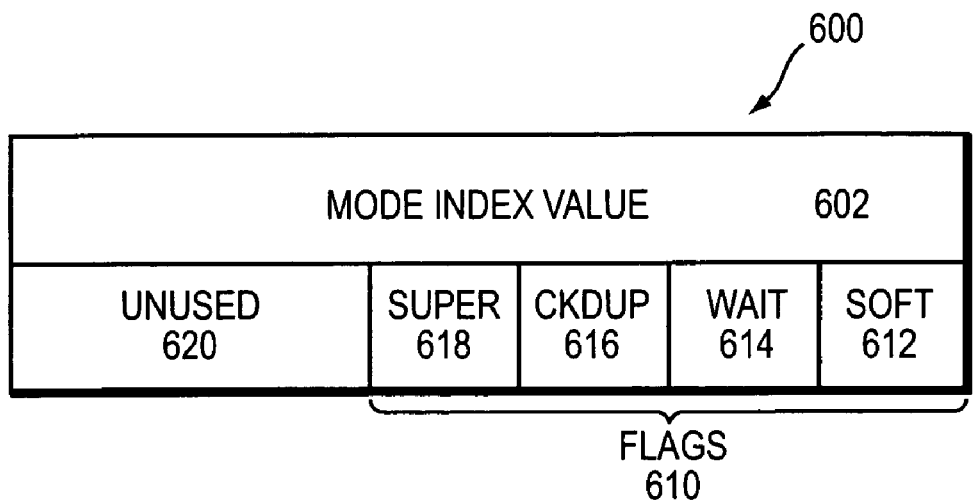
FIG. 6 is a schematic block diagram illustrating the format of a sharelock info data structure of the novel lock manager.

FIG. 6 is a schematic block diagram illustrating the format of a sharelock info structure 600 that may be advantageously used with the present invention. The sharelock block 600 comprises a mode field 602 containing a value used as the mode index into the mode definition table for share locks. A flags field 610 of the structure contains a plurality of general locking flags. In the illustrative embodiment, these flags include a soft flag 612 indicating a soft or revocable lock and a wait flag 614 specifying that if this lock is not granted, the request should wait for it to be granted, subject to protocol-implemented limits on wait times and other special conditions which may terminate or suppress waiting. A ckdup flag 616 indicates that a check should be made for duplicates of existing locks when granting a lock. Note that this check may require a scan of existing locks, even when there is some degree of certainty that there are no conflicts. A super flag 618 indicates that the lock to be created (and granted) is a super-lock, the presence of any conflicting locks notwithstanding. The remaining bits of field 620 are unused.

Action Disposition

Figure 7:
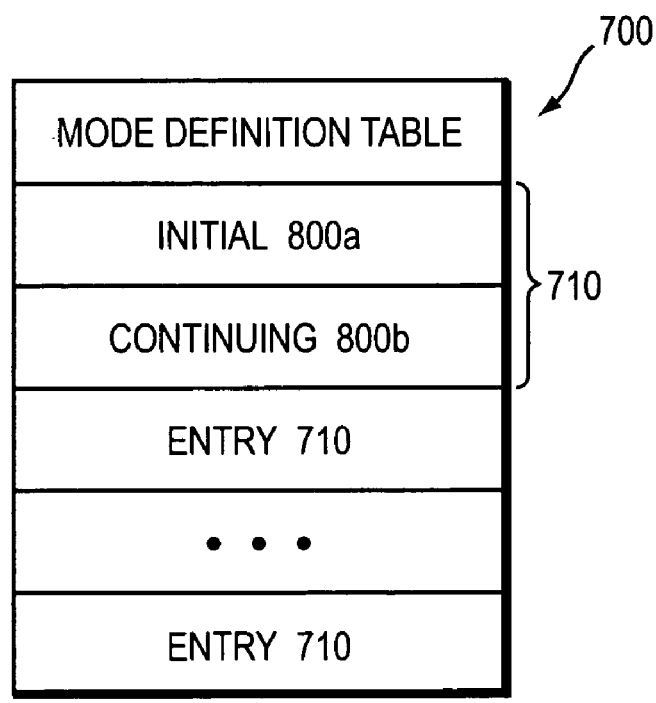
FIG. 7 is a schematic block diagram of a mode definition table containing a plurality of mode definitions in accordance with the present invention.

As noted, the sharelock info structure 600 contains a mode index value (stored in field 602) for accessing entries of a mode definition table 700 that contain relevant action dispositions. The bytelock info block 1000 contains a lock flags field 1010 whose contents are used to form a similar index into a similar mode definition table 700. FIG. 7 is a schematic block diagram of the mode definition table 700 containing a plurality of entries or mode definitions 710. Each mode definition 710 comprises two data structures called action dispositions, an initial action disposition 800*a* used for an initial test of lock grant-ability, and a continuing action disposition 800*b* stored in the lock object 400 for use with subsequent tests for other locks being granted. Each action disposition 800, in turn, comprises two action sets, a set of actions to be allowed and a set of actions to be denied. The mode definition table is configured (set up) during initialization of the multi-protocol lock manager.

Figures 8, 9:
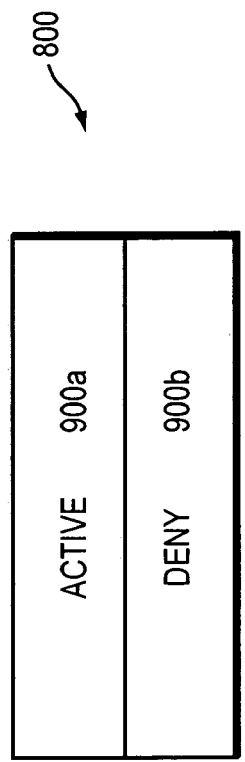
FIG. 8 is a schematic block diagram illustrating the format of an action disposition in accordance with the present invention.
FIG. 9 is a schematic block diagram of the format of an action set in accordance with the present invention.

FIG. 8 is a schematic block diagram illustrating the format of an action disposition 800 comprising two action set structures: an active action set 900*a* for active bits and a deny action set 900*b* for denial bits. Each action set is implemented as a bit mask having a plurality of bits, with each bit representing some action, such as opening a file for a write operation. In the illustrative embodiment, the mode definition 710 must be "well-formed" in that neither action set 900*a,b* for a continuing disposition 800*b* contains any bit not present in the corresponding action set of the initial disposition 800*a*. This is so that an initial lock compatibility test, when successful, does not result in a lock being granted whose continuing disposition 800*b* is incompatible with any other granted lock.

Action Set

FIG. 9 is a schematic block diagram of the format of an action set 900. The action set 900 contains a first group of action bits 910 (e.g., bits 0-4) that are generally marked as active, not because of existing locks but because of special conditions present for a file. However, these special conditions may be tested by deny specifications within lock requests, just as if they were conditions specified by normal locks. In particular, an always bit 910 (bit 0) indicates a special condition and is always asserted so that a request which denies the condition will never be granted. A deleted bit 912 (bit 1) is asserted when the file has been marked for deletion and a streams bit 914 (bit 2) is asserted when a subordinate stream has one or more locks. An ingrace bit 915 (bit 3) is asserted during the special grace period for lock reclaims and an outgrace bit 916 (bit 4) is asserted outside of that special grace period. Note that bit 918 (bit 5) is currently not used.

A second group of action bits 920 (e.g., bits 6-7) deals with special locks that are used to delegate control of a file to a client, e.g., CIFS oplocks and NFS-v4 delegations. Locks specifying such bits (in the active set) are specified as soft locks. Specifically, an exci bit 922 (bit 6) indicates exclusive control of a file (exclusive oplock or write delegation). A nochg bit 924 (bit 7) indicates read-only control of the file (type-2 oplock or read delegation).

A third group of action bits 930 are used to handle file open requests and associated share locks. In this group, a shfr bit 932 (bit 8) specifies read access for non-open share reservations as used, for example, to implement NLM share reservations, whereas a shfw bit 934 (bit 9) specifies write access for non-open share reservations as used, for example, to implement NLM share reservations. An openr bit 935 (bit 10) specifies open for read access as used, for example, to implement CIFS or NFS-v4 open requests and an openw bit 936 (bit 11) specifies opening a file for write access as used, for example, to implement CIFS or NFS-v4 open requests. An nshdel bit 938 (bit 12) specifies an open request that is not share-delete, a keepn bit 940 (bit 13) specifies an open request that prevents deletion or change of the associated file's name (i.e. CIFS open requests) and a cifsow bit 942 (bit 14) specifies specially-marked, writable CIFS open requests.

A fourth group of action bits 950 are associated with byte-range locking and include a mblr bit 952 (bit 15) indicating a mandatory byte-range lock for a read request (i.e. shared access) and a mblw bit 954 (bit 16) indicating a mandatory byte-range lock for a write request (i.e. exclusive access). An ablr bit 955 (bit 17) indicates an advisory byte-range lock for a read request (i.e. shared access), whereas an ablw bit 956 (bit 18) indicates an advisory byte-range lock for a write request (i.e. exclusive access). A dublr bit 958 (bit 19) specifies a share lock present, thereby denying uncovered byte-range locks for a read request. The bit 958 is used so that open requests with denial bits (which thereby deny uncovered byte-range locks) appear in the active set so they can be tested "up-front" using the active bits in the inode. A dublw bit 960 (bit 20) specifies a share lock present, thereby denying uncovered byte-range locks for a write request. Bit 960 is used so that open requests with denial bits (which thereby deny uncovered byte-range locks) appear in the active set so they can be tested up-front using the active bits in the inode.

Lastly, a fifth group of action bits 970 are provided for various miscellaneous types of locks. Here, a singlec bit 972 (bit 21) indicates a lock in DOS single-client mode. A supero bit 974 (bit 22) indicates that a special super-lock client has a file open, while a dafs_nodel bit 975 (bit 23) indicates a DAFS open with delete-deny. The remaining 8 bits of field 980 are currently unused and available to implement new lock types.

Action Disposition Compatibility

Given an action disposition specified as two action sets, a number of relations and operations can be defined. These relations and operations on action dispositions apply to both share locks and byte-range locks. Byte-range locks have, in addition, a separate set of compatibility relationships, which only apply to byte-range locks, and then only when they designate overlapping byte ranges.

(i) Two dispositions are compatible if, and only if, the allowed set of each is disjoint from the denied set of the other. This defines a symmetric relation. The compatibility relation governs whether a lock can be granted. The lock to be granted must be compatible with all locks currently granted.

(ii) The union of two compatible dispositions is defined as having an allowed set equal to the union of the two locks' allowed sets and a denied set equal to the union of the two locks' denied sets. If each of the two dispositions is compatible with a third, their union is compatible with that third disposition as well. By forming the union of a set of compatible locks, efficient testing can be performed to determine whether a given lock is compatible with all currently granted locks, by first forming (or having available) the union for all existing locks and then checking the new lock for compatibility with that union.

(iii) A disposition A is defined as weaker than another disposition B if A's allowed set is a subset of B's allowed set and A's denied set is a subset of B's denied set (and at least one of those two subsets is a proper subset). This defines a partial order that has the property that if B is compatible with C and A is weaker than B, then A is compatible with C as well. Partial ordering of locks by strength is important when implementing soft locks since revocation of a soft lock may involve replacing that lock by a collection of hard locks which combined are no stronger than the original soft lock. The fact that they are no stronger implies that such a replacement would always be valid.

Action disposition compatibility is defined in terms of action sets and, more specifically, in terms of compatibility among action sets without reference to specific locks. Two action dispositions are compatible if the deny-set of each is disjoint from the allowed-set of the other. Action dispositions can be partially ordered by a strength relationship. One action disposition is stronger than another if the allowed-set of the second is a subset of the allowed-set of the first, the deny-set of the second is a subset of the deny-set of the second, and the two action dispositions are not equal.

Figure 13:
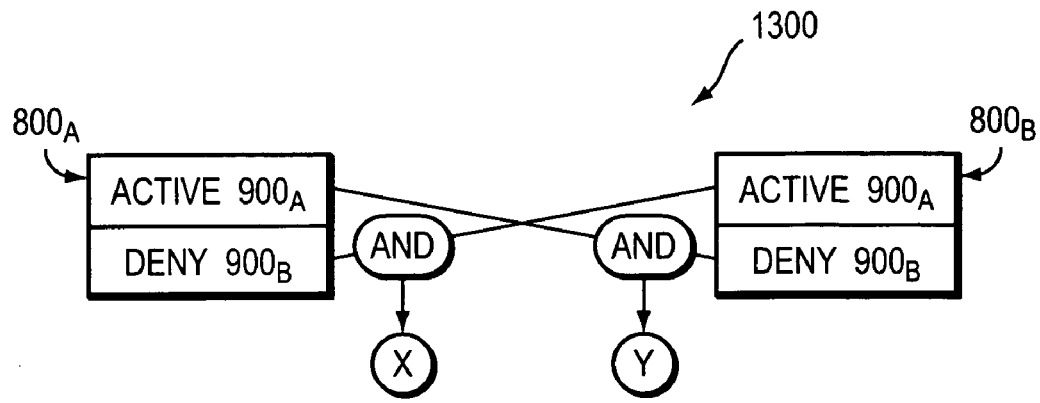
FIG. 13 is a schematic block diagram illustrating a technique used by the lock manager to determine a compatibility relation between action dispositions according to the present invention.

FIG. 13 is a schematic block diagram illustrating a technique 1300 used by the lock manager 300 to determine the compatibility relation between action dispositions $800_{A,B}$. An active action set 900$a$ and a deny action set 900$b$ of the two action dispositions 800 are cross-combined using a bit-wise logical, e.g., a booleon AND, operation to produce two quantities, namely resulting action sets $900_{X,Y}$.

Figure 14:
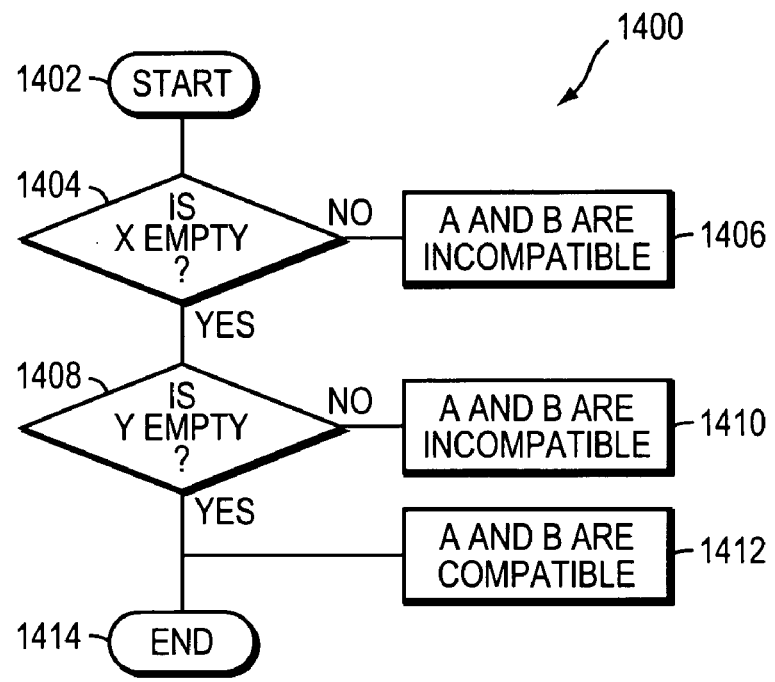
FIG. 14 is a flow chart illustrating a sequence of steps used to define a compatibility test of the present invention.

FIG. 14 is a flow chart illustrating a sequence of steps used to define a compatibility test 1400. According to the present invention, the compatibility test 1400 provides that action dispositions are compatible if, and only if, nothing of what each one specifies as active is denied by the other. The sequence starts at Step 1402 and proceeds to Step 1404 where a determination is made as to whether action set $900_X$ (X) is empty. If not, then action dispositions $800_{AB}$ (A and B) are incompatible (Step 1406). If action set $900_X$ is empty (Step 1404), then a determination is made at Step 1408 as to whether action set $900_Y$ (Y) is empty. If not, then action dispositions $800_{A,B}$ are incompatible (Step 1410). However, if action set $900_Y$ is empty (Step 1408), then action dispositions $800_{AB}$ are compatible (Step 1412). The sequence then ends at Step 1414.

Figure 12:
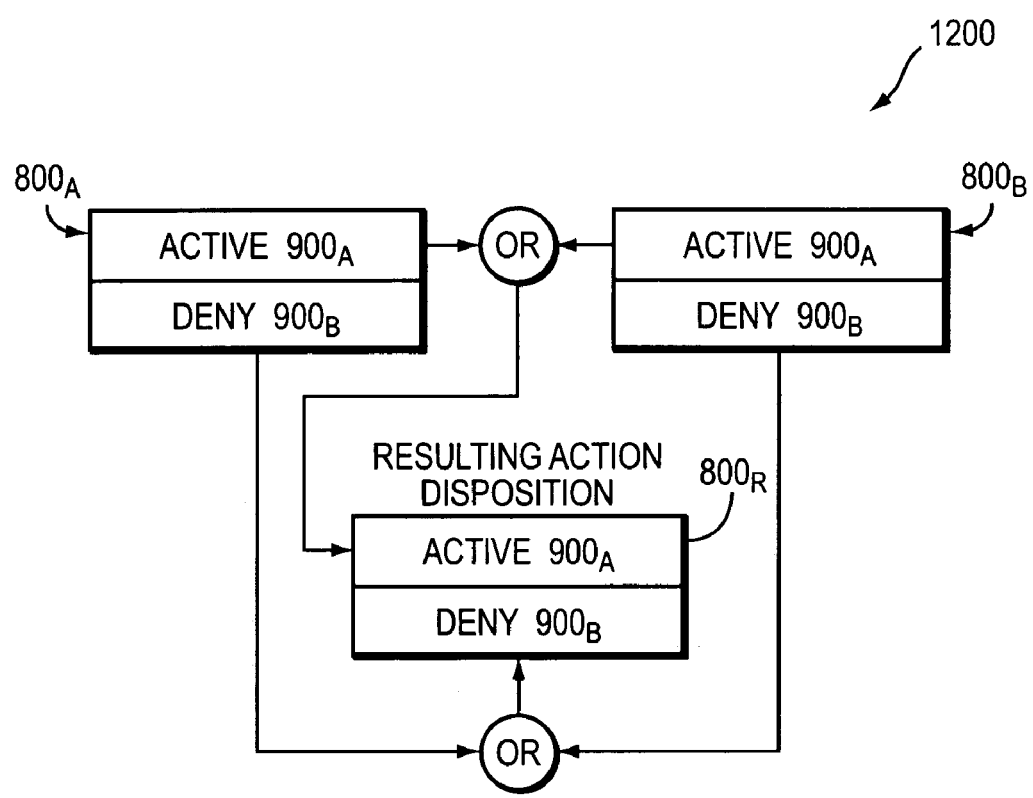
FIG. 12 is a schematic block diagram illustrating a technique used by the lock manager to efficiently combine action dispositions according to the present invention.

Compatible action dispositions can also be logically combined to test compatibility (of the set of locks whose dispositions are so combined) with other action dispositions by, e.g., OR-ing together the allowed and deny sets of each disposition in the set. FIG. 12 is a schematic block diagram illustrating a technique 1200 used by the lock manager 300 to efficiently combine action dispositions $800_{A,B}$. Specifically, both the active action set 900$a$ and the deny action set 900$b$ of each action disposition 800 are subjected to a bit-wise logical, e.g., a booleon OR, operation to produce a new resulting summary disposition $800_R$. The resulting summary disposition forms an element of an action summary that is used by the lock manager 300 to enable more efficient determination of whether a locking request can be granted than if action disposition compatibility is performed, one at a time, on each existing lock for the file.

SUMMARY DISPOSITION

For each file that has at least one lock, the lock manager 300 maintains two summary dispositions that combine sets of action dispositions for granted locks. These summary dispositions allow efficient determination of when a requested lock is action disposition compatible with all currently granted locks. Summary dispositions are maintained for the set of all granted locks and for the subset that consists of granted locks that are not revocable (also referred to as, as noted, hard locks in contrast to soft or revocable locks).

Figure 11:
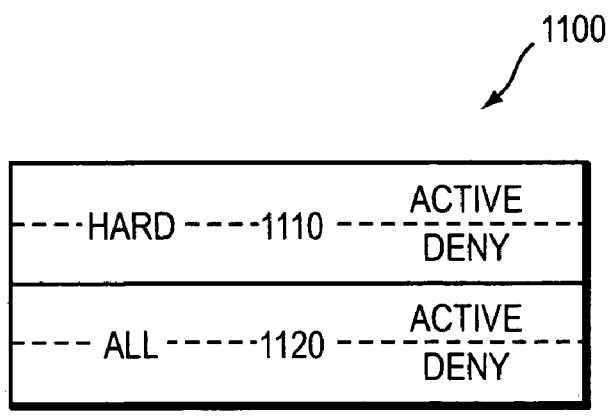
FIG. 11 is a schematic block diagram illustrating the format of an action summary in accordance with the present invention.

FIG. 11 is a schematic block diagram illustrating the format of an action summary 1100. An action summary 1100 comprises two summary dispositions, a hard summary disposition 1110 used to summarize dispositions for all granted hard locks and an all summary disposition 1120 used to summarize dispositions of all granted locks, including soft locks as wells as hard locks. Each summary disposition comprises, in turn, two action sets: an active action set 900*a* for active bits and a deny action set 900*b* for denial bits. The action summary 1100 is constructed in a manner that ensures that no bit in either of action sets 900*a,b* for the hard summary disposition 1110 may contain any bit not present in the corresponding action sets of the disposition summarizing all locks.

To avoid frequent traversals of the set of all granted locks, the summary dispositions are maintained as follows. Each summary disposition is always maintained so that its value is at least as strong as the combined disposition of the corresponding set of locks. In addition, a flag is maintained that indicates that the summaries are equal to (rather than stronger than or equal to) the combined disposition of the relevant set of locks. The summaries are maintained by combining the summary dispositions with the action disposition for a newly granted lock and making no change when a lock is released (or weakened in some way), except to reset the flag to indicate that the summary is no longer exact.

The summary disposition approach allows the lock manager to grant many lock requests without having to check the requests against each previously granted lock. Any lock that is compatible with the summary disposition must be compatible with combined action disposition of all granted locks (since it is at least as strong as that combination) and therefore must be action disposition compatible with all currently granted locks. When a requested lock is not compatible with the summary disposition and if the summary is exactly equal to the current combined action disposition of all granted locks (as indicated by the flag as described above), then the request cannot be currently granted and will be denied or made to wait (depending on request flags). If, on the other hand, the flag indicating summary exactness is not asserted, action disposition compatibility is checked individually for each currently granted lock. While the set of locks is traversed, a new (exact) action disposition summary can be generated, stored and marked as exact, enabling this information to be used to resolve subsequent requests.

Compatibility of Hard and Soft Locks

As noted, two summary dispositions are maintained for each file. Since the summary disposition that includes all locks is a superset (not necessarily strict) of the summary that includes only hard locks, any lock whose disposition is being tested for compatibility with existing locks will fall into one of three categories. When checking for the compatibility of a new lock with the set of currently granted locks, the two subsets of hard and soft locks are treated differently. Compatibility of the new lock with the combination of all locks is considered separately from compatibility of the new lock with the combination of hard locks only.

According to the invention, if a new lock request is incompatible with the combined disposition (i.e., sum or union) of all existing hard locks, then it is incompatible with the larger sum including all existing locks. In this case a locking conflict exists and the lock request is either denied or set up to wait for that denial condition conflict to be eliminated so that the lock can be granted (based on lock request flags). However, if the new lock is compatible with the union of all existing granted locks, then it must also be compatible with the union of the hard locks, which is a subset. In this case, the lock is compatible with both summary dispositions and, thus, can be granted immediately.

A last case is where the new lock is compatible with the combined disposition of all existing hard locks, but not compatible with the totality of all locks (including the soft ones). Here, one or more conflicting soft locks exist and revocation must be initiated for all such conflicting locks. That is, the new lock cannot be either granted or denied until soft locks that prevent the issue from being decided are revoked. Note that a specific protocol may choose to treat a deferral as equivalent to a denial. Since revocation can either substitute a corresponding hard lock for a soft one, or release the soft lock, the result may be either deferred granting or denial of the new lock.

Figure 15:
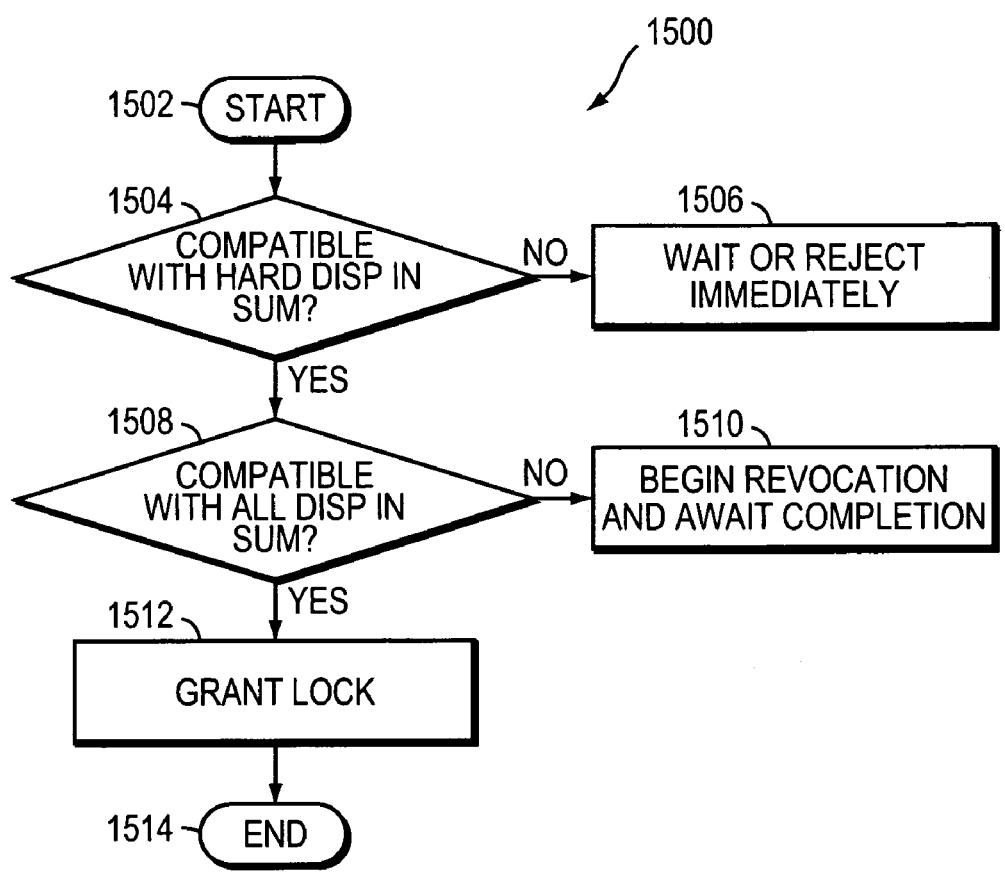
FIG. 15 is a flow chart illustrating a sequence of steps used to define a basic test for governing treatment of a newly requested lock according to the present invention.

FIG. 15 is a flow chart illustrating, at a conceptual level, a sequence of steps used to define a basic test 1500 for governing treatment of a newly requested lock. The test steps are expressed in terms of an action summary 1100 as reflected in the sum field 534 of the file object 500 for a file being locked. It should be noted that since the action disposition is not always maintained exactly, the actual code flow may sometimes differ from that illustrated herein.

The sequence starts at Step 1502 and proceeds to Step 1504 where a test for compatibility between a requested lock and a hard subset of granted locks is performed, as reflected in the summary 1100. If there is no compatibility (i.e., a conflict arises), the lock cannot be granted immediately and, in Step 1506, a wait or immediate rejection results. If the requested lock is compatible with all the hard locks (Step 1504), a determination is made in Step 1508 as to whether the lock is compatible with a set of all locks. If the lock is incompatible with the set of all locks, this reflects an incompatibility with some set of soft locks. In that case, the conflicting soft locks are subject to revocation and the lock request awaits completion of the revocation processing for those conflicting soft locks (Step 1510). However, if the requested lock is compatible with the summary of all granted locks, hard and soft (Step 1508), then it is compatible with each of them and the lock can be granted immediately in Step 1512. The sequence then ends at Step 1514.

Summary in Inode

There are situations where operations that do not directly obtain locks need to make sure that no conflicting locks exist. In the illustrative embodiment of the present invention, each inode of the file system contains a summary mask having a plurality of bits representing an action set that includes at least all bits in the union of the active sets for all granted locks. Code that needs to ensure that its particular operation will not be prevented by an extant lock can check the corresponding summary bit in the inode and, if it is not present, proceed without a call to the lock manager 300. If the bit is present, the lock manager call is made and a more detailed analysis is conducted to determine whether, e.g., a lock with that action bit is in fact held or soft locks need to be revoked. As a result, the summary mask must be updated in the inode when it changes in the lock manager. To that end, an inode pointer (address) is maintained in the inode field 544 of the file object 500 and used to update the inode when it is present in memory.

While there has been shown and described an illustrative embodiment of a multi-protocol lock manager configured to efficiently manage various types of locks on files or regions of files located on a filer, it is to be understood that various other adaptations and modifications may be made within the spirit and scope of the invention. In an alternate embodiment of the invention, the lock manager supports a generic concept of lock groups for use by the various file access protocols. Here the lock manager provides, for the use of the individual protocols, a general lock grouping facility that allows a set of locks having, e.g., a common owner to be subject to common treatment and kept track of together, regardless of how ownership is defined or implemented in the specific protocol.

The structure that defines a lock group (e.g., a lock group structure) is an abstract representation of a group of locks and contains an address of the first lock in the group. The lock group structure is public while the individual protocol-specific structures (which generally have a lock group structure embedded therein) are generally private and not referred to or known by the generic lock manager code. For example, the NFS/NLM protocol organizes its byte-range locks by owner (i.e. a pid on a single host) and maintains a lock group in the associated owner structure. Share locks are not differentiated by pid and are assigned to a lock group defined within the client structure. NFS-v4 (and DAFS) have groups which include all locks for a given file by a given lock owner (i.e., everything encompassed by a given state index at a given time).

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for managing locks on files or regions of files located on a file server in response to locking requests from various file access protocols, comprising:
   defining each locking request in terms of actions, each action defining a class of actions performed on a file or continuing states for the file, and associating each action with a bit position of an action set;
   determining compatibility of locking requests from the various file access protocols without reference to the protocols with which the locking requests are associated;
   deciding when each locking request should be granted, revoked or released in response to the step of determining;
   defining a summary disposition as comprising an active action set for active bits and a deny action set for denial bits;
   for each file that has at least one lock, maintaining a plurality of summary dispositions that combine sets of action dispositions for granted locks;
   defining an action summary as comprising a hard summary disposition used to summarize dispositions for all granted hard locks and an all summary disposition used to summarize dispositions of all granted locks, including soft locks as wells as hard locks;
   granting locking requests that are compatible with the action summary, wherein the locking request is compatible with union of all granted locks in action summary; and
   denying locking requests that are incompatible with the action summary.

2. The method of claim 1 wherein the step of determining compatibility of locking requests comprises determining compatibility of a requested lock with the granted locks.

3. The method of claim 2 wherein the step of determining compatibility of the requested lock with the granted locks comprises:
   determining compatibility between the requested lock and all granted hard locks, as reflected in the action summary; and
   if there is no compatibility, denying the requested lock.

4. The method of claim 3 wherein the step of determining compatibility of the requested lock with the granted locks further comprises:
   if the requested lock is compatible with all granted hard locks, determining whether the lock is compatible with all granted locks; and
   if the lock is incompatible with all granted locks, initiating revocation of all conflicting soft locks.

5. The method of claim 4 wherein the step of determining compatibility of the requested lock with the granted locks further comprises,
   if the requested lock is compatible with the action summary of all granted hard and soft locks, granting the requested lock.

6. A method for managing locks on files or regions of files located on a file server in response to locking requests from a plurality of file access protocols, the method comprising the steps of:
   configuring an allowed set of actions and a denied set of action upon initialization of a multi-protocol lock manager
   defining a new locking request in terms of the allowed set of actions and the denied set of actions;
   for each file that has a least one present lock, maintaining an action summary descriptive of the locks present on the file, the action summary having a first portion summarizing dispositions for granted hard locks for the file, and a second portion summarizing dispositions of granted locks for the file;
   determining if the allowed set of actions of the new locking request conflicts with the action summary, without reference to a specific file access protocol;
   granting the new locking request when the determining step does not find a conflict; and
   denying the new locking request when the determining step finds a conflict.

7. The method of claim 6 wherein each action of the allowed set of actions is represented by one or more bits set at particular bit positions of a data structure.

8. The method of claim 7 wherein each action of the action summary is represented by one or more bits set at particular bit positions of a data structure.

9. The method of claim 8 wherein the step of determining further comprises checking if the bits of the allowed set of actions are disjoint from the bits of the action summary at corresponding bit positions.

10. The method of claim 9 wherein the step of checking further comprises performing a Boolean AND operation on the bits at corresponding bit positions.

11. The method of claim 6 wherein the first portion is a hard summary disposition and the second portion is an all summary disposition.

12. The method of claim 11 wherein:
the hard summary disposition contains an active action set for active bits and a deny action set for denial bits; and
the all summary disposition contains an active action set for active bits and a deny action set for denial bits.

13. The method according to claim 12 comprising:
ensuring that no bit in either the active action set of the hard summary disposition or the deny action set of the hard summary disposition contains any bit not present in the corresponding action sets of the all summary disposition.

14. A multi-protocol lock manager configured to manage granting, revoking and releasing of locks on files or regions of files located on a file server in response to requests from a plurality of different file access protocols, the multi-protocol lock manager comprising:
a multi-protocol lock manager to configure an allowed set of actions and a denied set of action upon initialization;
an first action disposition structure associated with a new locking request and configured to define the new locking request in terms of the allowed set of actions and the denied set of actions;
an action summary descriptive of the locks present on the file, the action summary having a first portion summarizing dispositions for all granted hard locks for the file, and a second portion summarizing dispositions of all granted locks for the file; and
a code module configured to determine if the allowed set of actions of the new locking request conflicts with the action summary, without reference to a specific file access protocol, granting the new locking request upon determination of no conflict, and denying the new locking request upon determination of a conflict.

15. The multi-protocol lock manager of claim 14 wherein the first portion is a hard summary disposition and the second portion is an all summary disposition.

16. The multi-protocol lock manager of claim 15 wherein
the hard summary disposition contains an active action set for active bits and a deny action set for denial bits; and
the all summary disposition contains an active action set for active bits and a deny action set for denial bits.

17. The multi-protocol lock manager of claim 16 comprising:
ensuring that no bit in either the active action set of the hard summary disposition or the deny action set of the hard summary disposition contains any bit not present in the corresponding action sets of the all summary disposition.

18. A multi-protocol lock manager configured to manage granting, revoking and releasing of locks on files or regions of files located on a file server in response to requests from a plurality of different file access protocols, the multi-protocol lock manager comprising:
means for configuring an allowed set of actions and a denied set of action upon initialization of a multi-protocol lock manager; means for defining a new locking request in terms of the allowed set of actions and the denied set of actions;
means for maintaining an action summary descriptive of the locks present on the file, the action summary having a first portion summarizing dispositions for all granted hard locks for the file, and a second portion summarizing dispositions of all granted locks for the file; and
means for determining if the allowed set of actions of the new locking request conflicts with the action summary, without reference to a specific file access protocol, and, if there is no conflict, granting the new locking request.

19. The multi-protocol lock manager of claim 18 wherein the first portion is a hard summary disposition and the second portion is an all summary disposition.

20. The multi-protocol lock manager of claim 19 wherein
the hard summary disposition contains an active action set for active bits and a deny action set for denial bits; and
the all summary disposition contains an active action set for active bits and a deny action set for denial bits.

21. The multi-protocol lock manager of claim 20 wherein the action summary is constructed in a manner that ensures that no bit in either the active action set of the hard summary disposition or the deny action set of the hard summary disposition may contain any bit not present in the corresponding action sets of the all summary disposition.

22. A method for managing locks in response to locking requests from various file access protocols, the method comprising the steps of:
defining an action summary for a file as comprising a first portion summarizing dispositions for all granted hard locks for the file, and a second portion summarizing dispositions of all granted locks for the file; and receiving a locking request for the file;
granting a lock requested in the locking request if the lock requested is compatible with the action summary, wherein the locking request is compatible with union of all granted locks in action summary; and
denying a lock requested in the locking request if the lock requested is incompatible with the action summary.

23. The method of claim 22, further comprising:
defining an action summary for a region of a file as comprising a first portion summarizing dispositions for all granted hard locks for the region, and a second portion summarizing dispositions of all granted locks for the region; and
receiving a locking request for the file or region.

24. The method of claim 22 wherein the first portion is a hard summary disposition and the second portion is an all summary disposition.

25. The method of claim 24 wherein the all summary disposition summarizes dispositions of hard locks and soft locks for the file.

26. The method of claim 24 further comprising:
initiating revocation of a lock only if no hard locks are indicated in the hard summary disposition and a corresponding soft lock is indicated in the all summary disposition.

27. The method of claim 24 wherein:
the hard summary disposition contains an active action set for active bits and a deny action set for denial bits; and
the all summary disposition contains an active action set for active bits and a deny action set for denial bits.

28. The method according to claim 27 comprising:
ensuring that no bit in either the active action set of the hard summary disposition or the deny action set of the hard summary disposition contains any bit not present in the corresponding action sets of the all summary disposition.

29. A method for managing locking requests for a computer file, comprising:
defining an action summary for the file as comprising a first portion summarizing dispositions for all granted hard locks for the file, and a second portion summarizing dispositions of all granted locks for the file;

receiving a locking request for the file;

granting a locking request that is compatible with the action summary, wherein the locking request is compatible with union of all granted locks in action summary; and denying a locking request that is incompatible with the action summary.

* * * * *